United States Patent
Takayama et al.

(10) Patent No.: US 7,424,582 B2
(45) Date of Patent: Sep. 9, 2008

(54) STORAGE SYSTEM, FORMATTING METHOD AND COMPUTER PROGRAM TO ENABLE HIGH SPEED PHYSICAL FORMATTING

(75) Inventors: Satoru Takayama, Odawara (JP); Dai Taninaka, Odawara (JP); Keishi Tamura, Yokohama (JP)
n

(73) Assignee: Hitachi, Ltd., Tokyo (JP)

(*) Notice: Subject to any disclaimer, the term of this patent is extended or adjusted under 35 U.S.C. 154(b) by 207 days.

(21) Appl. No.: 11/237,887

(22) Filed: Sep. 29, 2005

(65) Prior Publication Data
US 2007/0028073 A1 Feb. 1, 2007

(30) Foreign Application Priority Data
Jul. 29, 2005 (JP) .............................. 2005-220040

(51) Int. Cl.
*G06F 12/00* (2006.01)
*G06F 13/00* (2006.01)
*G06F 13/362* (2006.01)
(52) U.S. Cl. ................ 711/162; 711/112; 711/114; 711/166; 711/170; 711/154; 711/203

(58) Field of Classification Search ................ 711/112, 711/162, 114, 168, 170, 154, 203
See application file for complete search history.

(56) References Cited

U.S. PATENT DOCUMENTS

| 5,206,939 | A | 4/1993 | Yanai et al. |
| 5,388,013 | A * | 2/1995 | Nakamura .................. 360/48 |
| 2001/0014929 | A1 * | 8/2001 | Taroda et al. .................. 711/4 |
| 2004/0221102 | A1 | 11/2004 | Watanabe |
| 2005/0071559 | A1 | 3/2005 | Tamura et al. |

FOREIGN PATENT DOCUMENTS

JP 2003-29934 7/2001

* cited by examiner

*Primary Examiner*—Hyung Sough
*Assistant Examiner*—Mardochee Chery
(74) *Attorney, Agent, or Firm*—Reed Smith LLP; Stanly P. Fisher, Esq.; Juan Carlos A. Marquez, Esq.

(57) ABSTRACT

Provided is a storage system having a first storage controller and a second storage controller. An actual device of the second storage controller is mapped to a virtual device of the first storage controller. The first storage controller has a port for transmitting control cylinder information to be written in a control information area of the actual device. As the format data to be transmitted from the first storage controller to the second storage controller, it will suffice so as long as control cylinder information is transmitted, and high speed formatting can be performed since it is not necessary to transmit 0 data.

14 Claims, 16 Drawing Sheets

FIG.5

MAPPING TABLE 301

| VDEV | EXTERNAL DEVICE INFORMATION | | | PATH INFORMATION | |
| | DEVICE IDENTIFYING INFORMATION | CAPACITY (KB) | DEVICE TYPE | WWN | LUN |
|---|---|---|---|---|---|
| 0 | DRFGTFNEIEK | 657,456 | DISK | 0xAABBCCDD | 0 |
| 1 | ADRFGTFNEIE | 89,854 | DISK | 0xAABBEEFF | 3 |
| 2 | GGRRFFDDERT | — | TAPE | 0x445566AAB | 5 |

LUN-LDEV-VDEV CONVERSION TABLE (STRIPE, RAID SETTING) — 304

| VDEV # | STRIPE SIZE | RAID LEVEL | OTHER COMPANY SS[ ]# | VDEV-EXTERNAL LUN PATH | | |
|---|---|---|---|---|---|---|
| | | | | INITIATOR PORT# | WWN | LUN |
| 1 | 64byte | RAID 1 | 1 | 1 | 0x00112233ANBCD | 0 |
| | | | | 4 | 0x001122334455678 | 0 |
| | | | | 3 | 0x001122337788990 | 4 |
| | | | 4 | 1 | 0x001122334455678 | 1 |
| | | | 6 | 3 | 0x001122337788990 | 2 |
| | | | 7 | 3 | 0x001122334455678 | 5 |

STORAGE SYSTEM, FORMATTING METHOD AND COMPUTER PROGRAM TO ENABLE HIGH SPEED PHYSICAL FORMATTING

CROSS-REFERENCES TO RELATED APPLICATIONS

This application relates to and claims priority from Japanese Patent Application No. 2005-220040, filed on Jul. 29, 2005, the entire disclosure of which is incorporated herein by reference.

BACKGROUND

The present invention relates to a storage system, formatting method and computer program product.

A storage system having a high capacity storage area is configured, for example, from a disk array device or the like. A disk array device is configured by arranging a plurality of storage devices in an array and, for instance, provides a memory area based on RAID (Redundant Arrays of Independent Inexpensive Disks). At least one or more logical volumes are formed on a physical storage area provided by the storage device group, and these logical volumes are provided to a host system. A host system is able to perform write access and read access to the logical volumes. In order to read and write data from and to the storage device in response to an access request from the host system, it is necessary to format the storage device in advance. For example, Japanese Patent Laid-Open Publication No. 2003-29934 refers to the physical formatting of a storage device.

In an open system, generally speaking, an FBA (Fixed Block Architecture) system for designating a logical block address is used as the recording system of a disk drive. With this FBA system, the storage device is formatted into a fixed length record. Meanwhile, with a mainframe system, generally speaking, a CKD (Count Key Data) system for designating the cylinder number, head number and record number is used as the recording system of a disk drive. With this CKD system, the storage device is formatted into a variable length record.

Further, with an open system, although it is possible to access the volume formatted in an FBA format, it is not possible to access the volume formatted in a CKD format. Meanwhile, with a mainframe system, although it is possible to access the volume formatted in a CKD format, it is not possible to access the volume formatted in an FBA format.

SUMMARY

Meanwhile, as an operation mode of the storage controller, an external device is provided as an internal device to a host system by mapping an external device (actual device) of an externally connected storage controller to an internal device (virtual device) of a host-connected storage controller.

In order to provide an open system external device (actual device) of the externally connected storage controller as a mainframe volume to the host system, it is necessary to format the open system external device into a mainframe volume. The mainframe volume contains a user data area subject to 0 padding, and a control information area to which control cylinder information is written therein. As a method of formatting the open system external device into a mainframe volume, considered may be a method of transmitting a write command for writing format data (0 data and control cylinder information) from the host-connected storage controller to the externally connected storage controller, and causing the externally connected storage controller to write such format data in the open system external device in order to format the external device into a mainframe.

Nevertheless, when the memory capacity of the external device becomes large, since enormous amounts of 0 data for writing in the entire user data area must be transmitted from the host-connected storage controller to the externally connected storage controller, the data transfer speed of the communication channel will become a bottleneck, and high speed format processing cannot be realized.

Accordingly, an object of the present invention is to overcome the foregoing problems and to enable the high speed physical formatting of the actual device of an externally connected storage controller.

In order to achieve the foregoing object, the storage system of the present invention has a first storage controller and a second storage controller. An actual device of the second storage controller is mapped to a virtual device of the first storage controller. The first storage controller has a port for transmitting control cylinder information to be written in a control information area of the actual device. As the format data to be transmitted from the first storage controller to the second storage controller, it will suffice so as long as control cylinder information is transmitted, and high speed formatting can be performed since it is not necessary to transmit 0 data.

As the second storage controller, it is preferable to subject the user data area of the actual device to 0 padding via physical formatting. If the user data area can be subject to 0 padding via physical formatting, high speed formatting will be enabled.

Further, as the first storage controller, it is preferable to further have a 0 status table for retaining the latest write data regarding the respective blocks in the user data area of the actual device in the second storage controller. The first storage controller returns 0 data to the read access to a prescribed block in the user data area of the actual device when there is no write access to the block in the past, refers to the 0 status table and returns the latest write data when there is write access to the block in the past, and writes the write data in the block in response to the write access to a prescribed block in the user data area of the actual device. According to the foregoing configuration, it will not be necessary to subject the user data area of the actual device in the second storage controller to 0 padding.

The storage system to which the formatting method of the present invention is applied has a first storage controller and a second storage controller. The actual device of the second storage controller is mapped to the virtual device of the first storage controller. This formatting method has a step of transmitting control cylinder information to be written in a control information area of the actual device from the first storage controller to the second storage controller; and a step of writing the control cylinder information that the second storage controller received from the first storage controller in the control information area of the actual device.

The storage system to which the computer program product of the present invention is applied has a first storage controller and a second storage controller. The actual device of the second storage controller is mapped to the virtual device of the first storage controller. This computer program product has a computer program for causing a storage system to execute the steps of transmitting control cylinder information to be written in a control information area of the actual device from the first storage controller to the second storage controller; and writing the control cylinder information that the second storage controller received from the first storage controller in the control information area of the actual device.

This computer program, for instance, may be installed in the storage system, or may be stored in a recording medium. As such recording medium, for example, the likes of an optical recording medium (a recording medium capable of optically reading data such as a CD-RAM, CD-ROM, DVD-RW, DVD-ROM, DVD-R, PD disk, MD disk or MO disk), a magnetic recording medium (a recording medium capable of magnetically reading data such as a flexible disk, magnetic card or magnetic tape) or a memory element (a semiconductor memory element such as a DRAM or a ferroelectric memory element such as an FRAM) may be used.

According to the present invention, the physical formatting of the actual device of an externally connected storage controller can be conducted at high speed.

DESCRIPTION OF THE DRAWINGS

FIG. 5 is an explanatory diagram of a mapping table;

DETAILED DESCRIPTION

Embodiments of the present invention are now explained with reference to the respective drawings.

Figure 1:
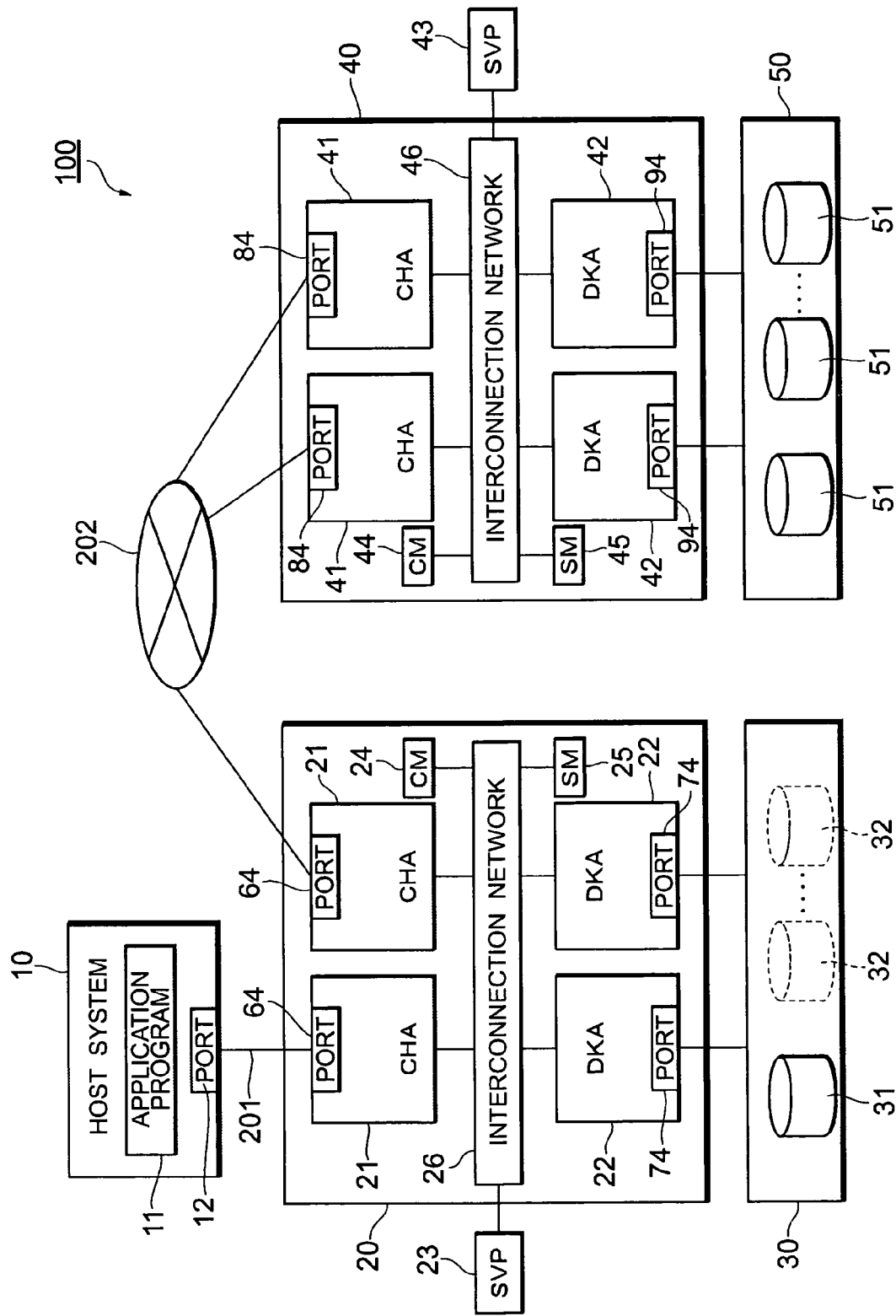
FIG. 1 is a block diagram showing the configuration of the storage system of the present embodiment.

FIG. 1 shows the system configuration of a storage system 100 according to the present embodiment. The storage system 100 is constituted by having a storage controller 20 and a storage controller 40, and performs data processing according to the request from a host system 10. The storage controller 20 and storage controller 40 are mutually connected via a communication network 202, and these may both be set in the same site, or may be disposed at different sites.

A host system 10 as a higher-level device, for instance, is a computer device having a CPU (Central Processing Unit), memory and the like, and, specifically, is configured as a personal computer, workstation, mainframe or the like. Further, the host system 10 is equipped with an application program 11, and a port 12 for accessing the storage controller 20 via the communication network 201. As the application program 11, for example, in addition to an application program such as a database to be used by the storage controller 20 for providing a storage resource, a managerial application program for managing the storage resource of the storage controller 20 may also be used.

The host system 10 is mutually connected with the storage controller 20 via the communication network 201. As the communication network 201, for instance, a LAN (Local Area Network), SAN (Storage Area Network), Internet, dedicated line, public line and so on may be arbitrarily used. Here, the data communication via the LAN is conducted according to the TCP/IP (Transmission Control Protocol/Internet Protocol) protocol. When the host system 10 is to be connected to the storage controller 20 via a LAN, the host system 10 will designate a file name and request data input/output in file units. Meanwhile, when the host system 10 is to be connected to the storage controller 20 via a SAN, the host system 10, according to a fibre channel protocol, requests the data input/output in block units, which is a data management unit of the storing area provided by a plurality of disk drives. When the communication network 201 is a LAN, for example, a LAN-compatible network card will be used as the port 12. When the communication network 201 is a SAN, for example, an HBA (Host Bus Adapter) will be used as the port 12.

The storage controller 20, for example, is constituted as a disk array device or the like. However, it is not limited thereto, and, for instance, the storage controller 20 may also be a virtual switch to become the SCSI target. As described later, since the storage controller 20 provides the storage resource of the storage controller 40 to the host system 10 as its own logical unit, it does not always have to possess a local storage device to be controlled directly.

The storage controller 20 has a plurality of channel adapters (CHA) 21, a plurality of disk adapters (DKA) 22, a management terminal (SVP) 23, a cache memory (CM) 24, a shared memory (SM) 25 and an interconnection network 26.

Each channel adapter 21 has a port 64 for performing data transmission with the host system 10. The port to be connected to the storage controller 40 among the plurality of ports 64 is referred to as an external port. The channel adapter 21 interprets and executes the various commands received from the host system 10. The channel adapter 21 is assigned a unique network address (for instance, an IP address or WWN (World Wide Name)). Each channel adapter 21 may independently function as a NAS (Network Attached Storage). Further, when there are a plurality of host systems 10, each channel adapter 21 is able to individually receive requests from the respective host systems 10.

Each disk adapter 22 gives and receives data to and from the storage devices 31, 32 of the storage apparatus 30. The disk adapter 22 has a port 74 for connecting to the storage devices 31, 32. The disk adapter 22 writes data received by the channel adapter 21 from the host system 10 in a prescribed address of the storage devices 31, 32 based on the write command from the host system 10, as well as reads data from a prescribed address of the storage devices 31, 32 based on the read command from the host system 10, and transmits this to the host system 10. The disk adapter 22 converts a logical address into a physical address when inputting and outputting data between the storage devices 31, 32. When the storage devices 31, 32 are managed according to RAID (Redundant Arrays of Independent Inexpensive Disks), the disk adapter 22 performs data access according to the RAID configuration.

The management terminal 23 is a terminal device for maintaining or managing the storage controller 20. By operating the management terminal 23, the system administrator, for instance, may set the logical device defined in the storage devices 31, 32, add or remove the storage devices 31, 32, and change the setting of the RAID configuration (for example, change RAID level 5 to RAID level 1). Further, as described later, by operating the management terminal 23, the system administrator may also perform the operation of mapping the storage device 51 as the internal device in the storage controller 20, the operation of reflecting the access attribute set in the storage device 51 to the internal device of the storage controller 20, or the operation of reflecting the access attribute set in the internal device of the storage controller 20 in the storage device 51.

The cache memory 24 is used for temporarily storing the data received from the host system 10, or the data read out from the storage devices 31, 32. The shared memory 25 stores various types of control information required for system management. As control information stored in the shared memory 25, for instance, a mapping table 301, a LUN-LDEV-VDEV conversion table 302, a VDEV-external LUN conversion table 303, and a VDEV-external LUN conversion table 304 and the like described layer may be used.

The interconnection network 26 mutually connects the channel adapter 21, disk adapter 22, management terminal 23, cache memory 24 and shared memory 25. The interconnection network 26, for instance, is a high speed bus such as an ultra high speed crossbar switch for performing data transmission based on high speed switching operations.

The storage apparatus 30 has a plurality of storage devices 31. The storage device 31, for example, is a physical device such as a hard disk drive, flexible disk drive, magnetic tape drive, semiconductor memory drive, optical disk drive or the like. Further, for instance, different types of disks such as an FC (Fibre Channel) disk and SATA (Serial AT Attachment) disk may coexist in the storage unit 170. The storage device 32 shown with the dotted line in the storage apparatus 30 shows the state of incorporating the storage device 51 of the storage controller 40 in the storage controller 20. That is, in the present embodiment, the storage device existing outside when viewed from the storage controller 20 is recognized as the internal storage device of the storage controller 20 so as to provide the host system 10 with the storage resource of the external storage device 51. The storage device 32 is a virtual device without an actual storage area. Since the storage device 32 exists inside the storage controller 20, it is sometimes referred to as an internal device. Contrarily, the storage device 51 is an actual device (physical device) having an actual storage area. Since the storage device 51 exists outside the storage controller 20, it is sometimes referred to as an external storage device.

Incidentally, although FIG. 1 shows an example of the host system 10 being connected only to the storage controller 20 via the communication network 201, the host system 10 and storage controller 40 may also be mutually connected via the communication network 202. The communication network 202 is, for example, a SAN, LAN, Internet, dedicated line, public line or the like.

Meanwhile, the storage controller 40 has a plurality of channel adapters (CHA) 41, a plurality of disk adapters (DKA) 42, a management terminal (SVP) 43, a cache memory (CM) 44, a shared memory (SM) 45 and an interconnection network 46.

Each channel adapter 41 has a port 84 for connecting to the communication network 202. Further, each disk adapter (DKA) 42 has a port 94 for connecting to the storage devices 31, 32. The storage controller 40 has the same configuration as the storage controller 20, and the detailed explanation thereof is omitted.

Incidentally, in order to differentiate the storage controllers 20, 40 in this specification, the former may be separately referred to as a host-connected storage controller or a first storage controller, and the latter may be separately referred to as an externally connected storage controller or a second storage controller.

Figure 2:
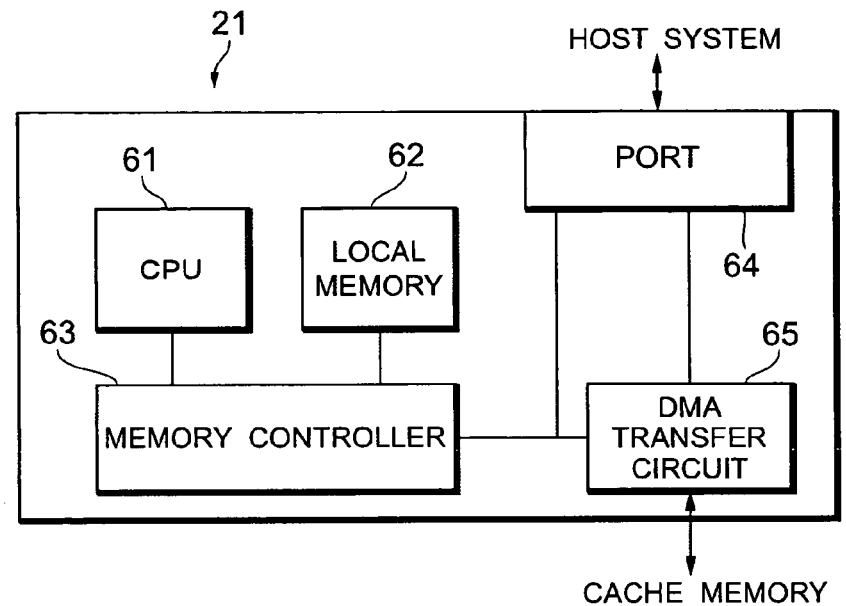
FIG. 2 is a block diagram showing the configuration of a channel adapter.

FIG. 2 shows the system configuration of the channel adapter 21. The channel adapter 21 is configured by having a CPU 61, a local memory 62, a memory controller 63, a port 64 and a DMA (Direct Memory Access) transfer circuit 65. The CPU 61 operates based on the channel adapter firmware loaded in the local memory 62, and performs the transmission and reception of data to and from the DMA transfer circuit 65 or port 64 via the memory controller 63. The port 64 functions as a host interface for performing data communication with the host system 10 based on a communication protocol such as a fibre channel protocol or SCSI protocol. The DMA transfer circuit 65 DMA-transfers the data transmitted from the host system 10 pursuant to the instructions from the CPU 61 to the cache memory 24, or DMA-transfers the data stored in the cache memory 24 to the host system 10.

Incidentally, the channel adapter 41 has the same configuration.

Figure 3:
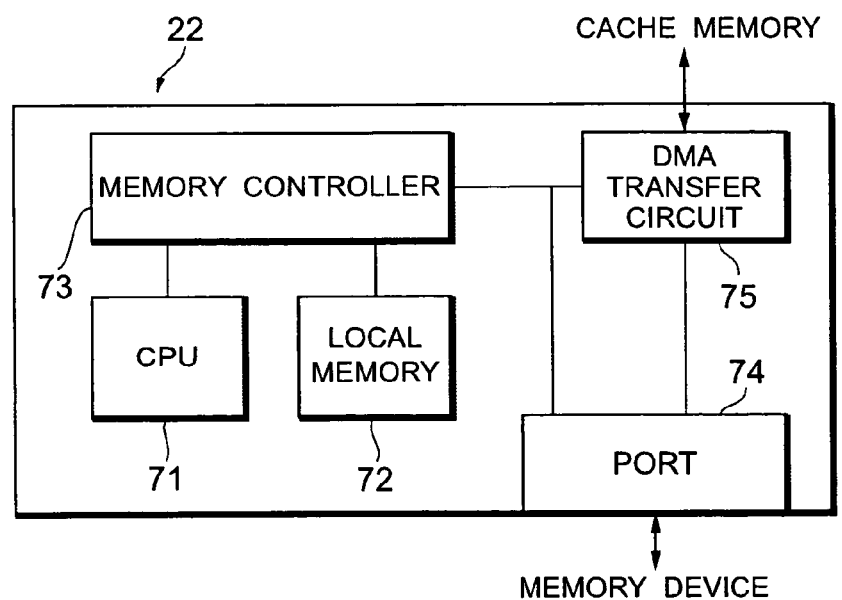
FIG. 3 is a block diagram showing the configuration of a disk adapter.

FIG. 3 shows the system configuration of the disk adapter 22. The disk adapter 22 is configured by having a CPU 71, a local memory 72, a memory controller 73, a port 74 and a DMA transfer circuit 75. The CPU 71 operates based on the disk adapter firmware loaded in the local memory 72, and performs the transmission and reception of data to and from the DMA transfer circuit 75 or port 74 via the memory controller 73. The port 74 functions as a host interface for performing data communication with the storage devices 31, 32 based on a communication protocol such as a fibre channel protocol or SCSI protocol. The DMA transfer circuit 75 DMA-transfers the data transmitted from the storage device 31 pursuant to the instructions from the CPU 71 to the cache memory 24, or DMA-transfers the data stored in the cache memory 24 to the storage device 31.

Incidentally, the disk adapter 42 has the same configuration.

Figure 4:
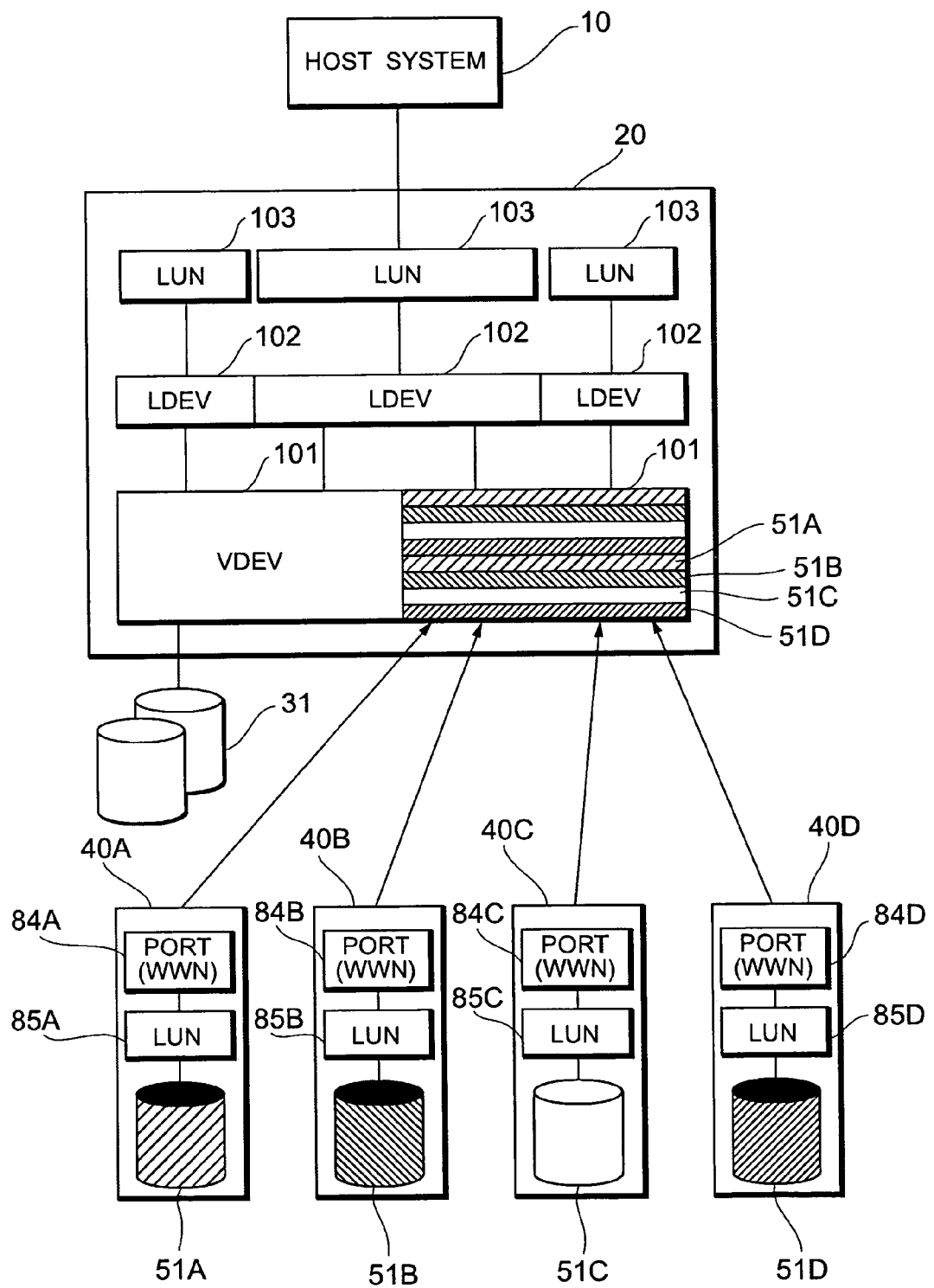
FIG. 4 is an explanatory diagram showing a logical storage hierarchy in the storage controller.

FIG. 4 shows the logical storage hierarchy in the storage controller 20. The storage controller 20 has a three-tier storage hierarchy formed from a VDEV (Virtual Device) 101, a LDEV (Logical Device) 102, and a LUN (Logical Unit Number) 103 in order from the lower tier.

The VDEV 101 is a virtual device positioned at the bottom of the logical storage hierarchy. The VDEV 101 is a virtualization of the physical storage resource, and, for example, may employ the RAID configuration. In other words, a plurality of VDEVs 101 may be formed from a single storage device 31 (slicing), and a single VDEV 101 may be formed from a plurality of storage devices 31 (striping). The VDEV 101 depicted on the left side of FIG. 2, for instance, is virtualizing the storage device 31 according to the RAID configuration.

Meanwhile, the VDEV 101 depicted on the right side of FIG. 2 is constituted by mapping the storage device 51 of the storage controller 40. In other words, in the present embodiment, the VDEV 101 can be used as the internal volume of the storage controller 20 by mapping the logical device (LDEV) provided by the storage device 51 of the storage controller 40 to the VDEV 101 with a mapping table 301 described later. In the example illustrated in FIG. 2, the VDEV 101 is configured by striping four storage devices 51A, 51B, 51C, 51D. Each of the storage devices 51A, 51B, 51C, 51D can be individually accessed by specifying the respective LUNs 85A, 85B, 85C, 85D from the respective ports 84A, 84B, 84C, 84D. Each port 84A, 84B, 84C, 84D is assigned a WWN, which is unique identifying information, and, further, since each LUN 85A, 85B, 85C, 85D is provided with a LUN number, the combination of the WWN and LUN number will enable the specification of the storage devices 51A, 51B, 51C, 51D.

The LDEV 102 is provided on the VDEV 101. The LDEV 102 is a logical device (logical volume) virtualizing the VDEV 101. A single VDEV 101 may be connected to two LDEVs 102, or a plurality of VDEVs 101 may be connected to a single LDEV 102. The LDEV 102 may be accessed via the respective LUNs 103. As described above, in the present embodiment, by connecting the storage device 51 to the intermediate storage hierarchy (VDEV 101, LDEV 102) positioned between the LUN 103 and storage device 51, the external storage device 51 can be used as an internal device of the storage controller 20.

Incidentally, as a mode of mapping the storage device 51 of the storage controller 40 to the VDEV 101 of the storage controller 20, for instance, each of the storage devices of a plurality of cascaded externally connected storage controllers may be sequentially mapped to the storage device of the connection destination. For example, when N number of storage devices are cascaded, as a matter of convenience for explanation, the storage device to be connected to the host-connected storage controller is referred to as the first storage device, and the storage device to be connected to the first storage device is referred to as the second storage device, the storage device to be connected to the second storage device is referred to as the third storage device, and the terminal storage device is referred to as the Nth storage device. In this kind of connection mode, the Nth storage device is mapped to the (N−1) storage device, which is the connection destination thereof, the (N−1) storage device is mapped to the (N−2) storage device, which is the connection destination thereof, and this is sequentially repeated until the first storage device is ultimately mapped to the VDEV 101 of the storage controller 20. Here, although the Nth storage device is an actual device, the other storage devices (first storage device, second storage device, . . . , (N−1) storage device) are virtual devices.

FIG. 5 shows the table configuration of the mapping table 301 for mapping the storage device 51 (specifically, the LDEV provided by the external storage device 51) to the VDEV 101. The mapping table 301, for example, may be configured by respectively associating the VDEV number for respectively identifying the VDEVs 101, and information regarding the external storage device 51. The external device information, for instance, may be configured by including the device identifying information, memory capacity of the storage device 51, information showing type of device (for instance, tape device/disk device), and path information to the storage device 51. Path information is constituted by including unique identifying information (WWN) of the respective ports 81 and the LUN number for identifying the LU 85.

Incidentally, the device identifying information, capacity, device type, WWN and LUN number shown in FIG. 5 are values used as a matter of convenience for explanation, and do not have any special meaning. By using this kind of mapping table 301, one or a plurality of external storage devices 51 can be mapped to one or more VDEVs 101 in the storage controller 20.

Next, the input and output (read/write) of data between the storage controller 20 and storage controller 40 are explained with reference to FIG. 6 to FIG. 11.

Figure 6:
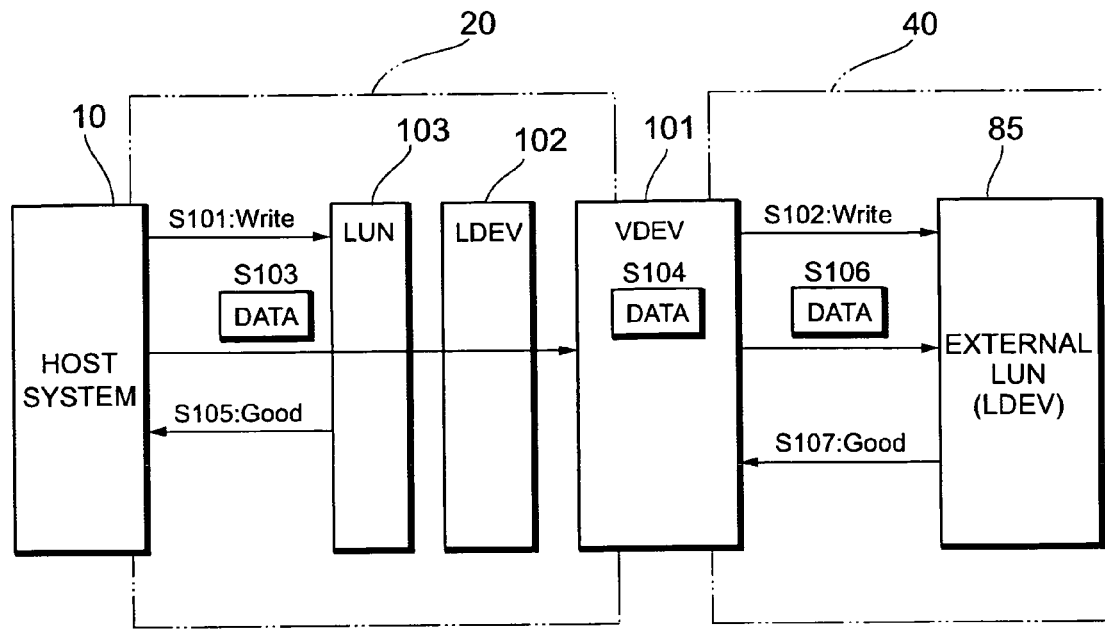
FIG. 6 is a diagram showing the flow of data during the write processing mainly regarding the usage of the storage hierarchy.
Figure 7:
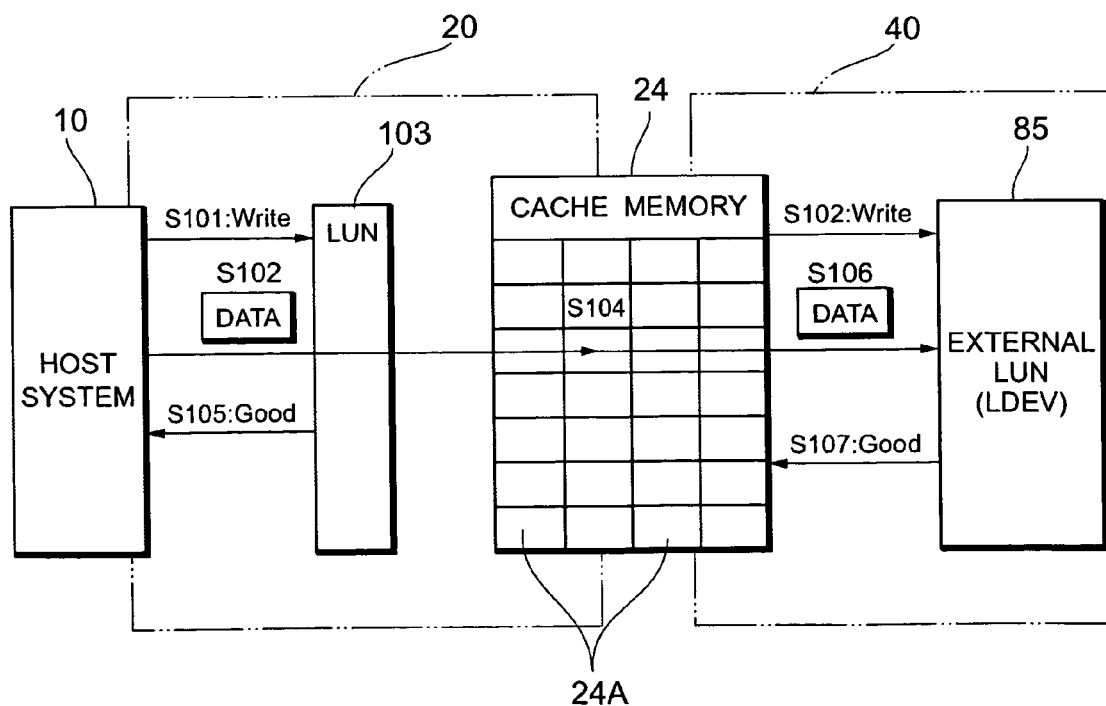
FIG. 7 is a diagram showing the flow of data during the write processing mainly regarding the usage of the cache memory.

FIG. 6 and FIG. 7 show the flow of data during write processing. FIG. 6 is a flowchart mainly showing the storage hierarchy, and FIG. 7 is a flowchart mainly showing the usage of the cache memory 24.

The host system 10 is able to write data in the LDEV 102 provided by the storage controller 20. For example, the host system 10 can be set to access only specific LDEVs 102 by methods such as zoning of setting a virtual SAN subnet in the SAN, or LUN masking of the host system 10 retaining a list of accessible LUNs 103.

When the LDEV 102 to which the host system 10 is attempting to write data is connected to the internal storage device 31 via the VDEV 10, data is written via normal processing. In other words, data from the host system 10 is temporarily stored in the cache memory 24, and then stored in a prescribed address of a prescribed storage device 31 from the cache memory 24 via the disk adapter 22. Thereupon, the disk adapter 22 converts the logical address into a physical address. Further, in the case of a RAID configuration, the same data is stored in a plurality of storage devices 31.

Contrarily, when the LDEV 102 to which the host system 10 is attempting to write data is connected to the external storage device 42 via the VDEV 101, data is written according to the flow illustrated in FIG. 6. The host system 10 defines the LDEV number for specifying the LDEV 102 of the write destination and the WWN for specifying the communication port 21A for accessing this LDEV 102, and issues a write command (Write) (S101).

When the storage controller 20 receives the write command from the host system 10, it creates a write command to be transmitted to the storage controller 40, and transmits this to the storage controller 40 (S102). The storage controller 20 creates a new write command by changing the write destination address information and the like in the write command received from the host system 10 in accordance with the LUN 85 of the storage controller 40.

Next, the host system 10 transmits the data to be written to the storage controller 40 (S103). The data received by the storage controller 20 is forwarded to the LUN 85 of the storage controller 40 (S106) from the LDEV 102 via the VDEV 101 (S104). Here, at the point in time the storage controller 20 stores the data from the host system 10 in the cache memory 24, it returns a reply (Good) to the host system 10 indicating that the writing is complete (S1O5). At the point in time the storage controller 40 receives the data from the storage controller 20 (or at the time the storage controller 40 finishes writing in the storage device 51), it transmits a write completion report to the storage controller 20 (S107). In other words, the timing of the storage controller 20 reporting the completion of writing to the host system 10 (S105) and the timing of the data actually being stored in the storage device 42 will differ (asynchronous method). Therefore, the host system 10 will be freed from the data write processing before the data is actually stored in the storage device 51, and may perform other processes.

As shown in FIG. 7, a plurality of sub blocks 24A are provided to the cache memory 24. The storage controller 20 converts the logical block address designated from the host system 10 into a sub block address, and stores the data in a prescribed location of the cache memory 24 (S104).

Figures 8, 9:
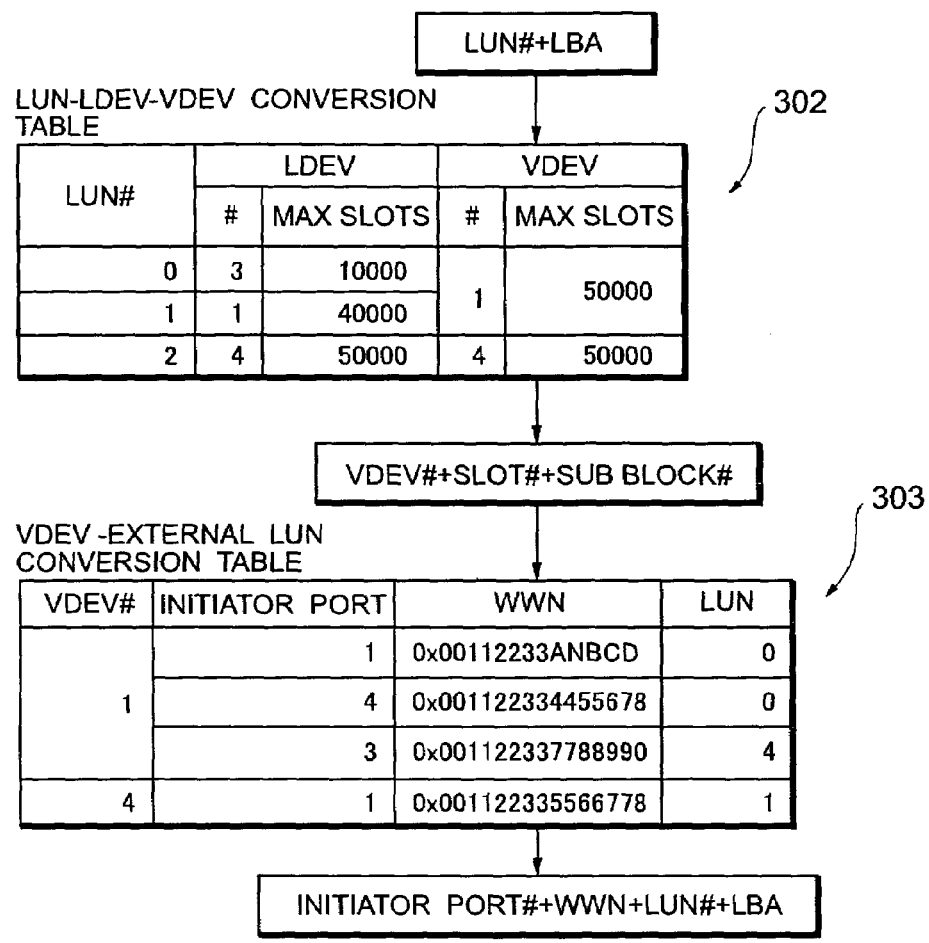
FIG. 8 is a diagram showing the flow of address conversion for accessing an external device.
FIG. 9 is an explanatory diagram of a VDEV-external LUN conversion table.

FIG. 8 shows a state where the storage controller 20 is converting the address with an address conversion table when there is an access request from the host system 10 to the storage controller 20. The host system 10 transmits data to a prescribed communication port 64 upon designating the LUN number (LUN#) and logical block address (LBA). The storage controller 20 converts the data (LUN# +LBA) input for the LDEV 102 into data for the VDEV 101 based on the address conversion table 302. The address conversion table 302 is a LUN-LDEV-VDEV mapping table for converting data designating the internal LUN 103 into data for the VDEV 101. This address conversion table 302, for instance, is configured by associating the LUN number (LUN#), the number (LDEV#) of the LDEV 102 corresponding to the LUN 103 and the maximum number of slots, and the number (VDEV#) of the VDEV 101 corresponding to the LDEV 102 and the maximum number of slots. As a result of referring to this address conversion table 302, data (LUN#+LBA) from the host system 10 is converted into data (VDEV#+SLOT#+ SUBBLOCK#) for the VDEV 101.

Next, the storage controller 20 refers to the address conversion table 303, and converts data for the VDEV 101 into data to be transmitted to and stored in the LUN 85 of the storage controller 40. The address conversion table 303, for instance, is configured by associating the number of the VDEV 101 (VDEV#), initiator port number for transmitting the data from such VDEV 101 to the storage controller 40, WWN for specifying the communication port 84 of the data forwarding destination, and LUN number accessible via this port 84. Based on this address conversion table 303, the storage controller 20 converts the destination information of the data to be stored into the format of initiator port number#+ WWN+LUN#+LBA. Data in which the destination information has been changed as described above arrives at the designated port 84 from the designated initiator port via the communication network 202. Then, the data is stored in a prescribed location of the LDEV accessible with the designated LUN 43.

FIG. 9 shows an address conversion table 304 in another embodiment. This address conversion table 304 is used when applying striping or RAID to the VDEV 101 to which the external storage device 51 is mapped. The address conversion table 304 is configured by associating the VDEV number (VDEV#), stripe size, RAID level, number for identifying the storage controller 40 (SS# (storage system number)), initiator port number, WWN of the communication port 84, and number of the LUN 85. With the example shown in FIG. 9, a single VDEV 101 configures RAID 1 by using a total of four external storage controllers specified by SS# (1, 4, 6, 7). Further, the three LUNs (#0, #0, #4) assigned to SS#1 are set in the same device (LDEV#). As described above, by configuring the VDEV 101 from a plurality of logical volumes (LDEVs) existing outside, the functions of striping or RAID can be added upon providing this to the host system 10.

Figure 10:
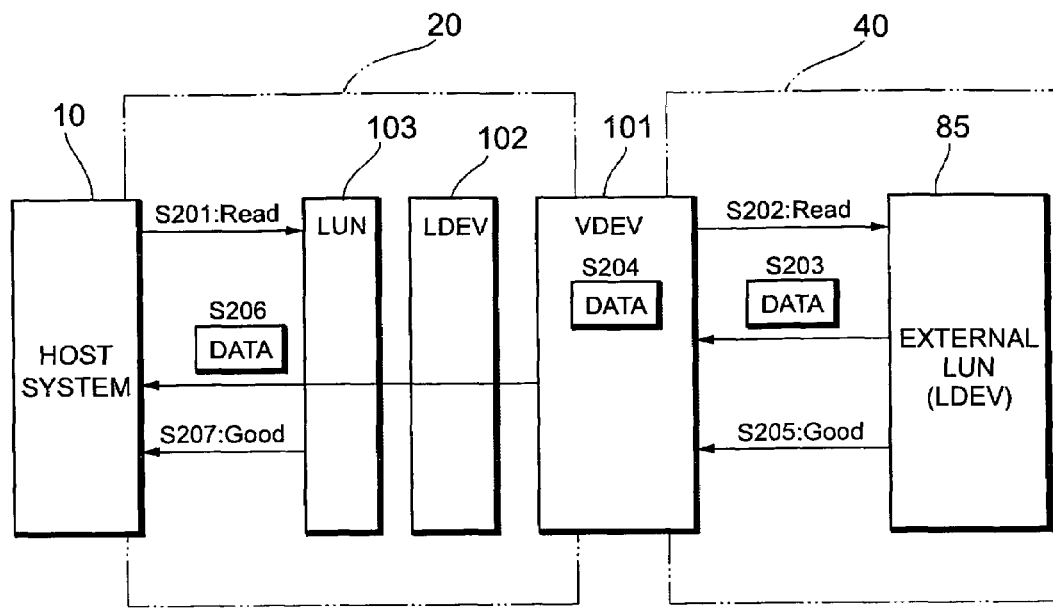
FIG. 10 is a diagram showing the flow of data during the read processing mainly regarding the usage of the storage hierarchy.
Figure 11:
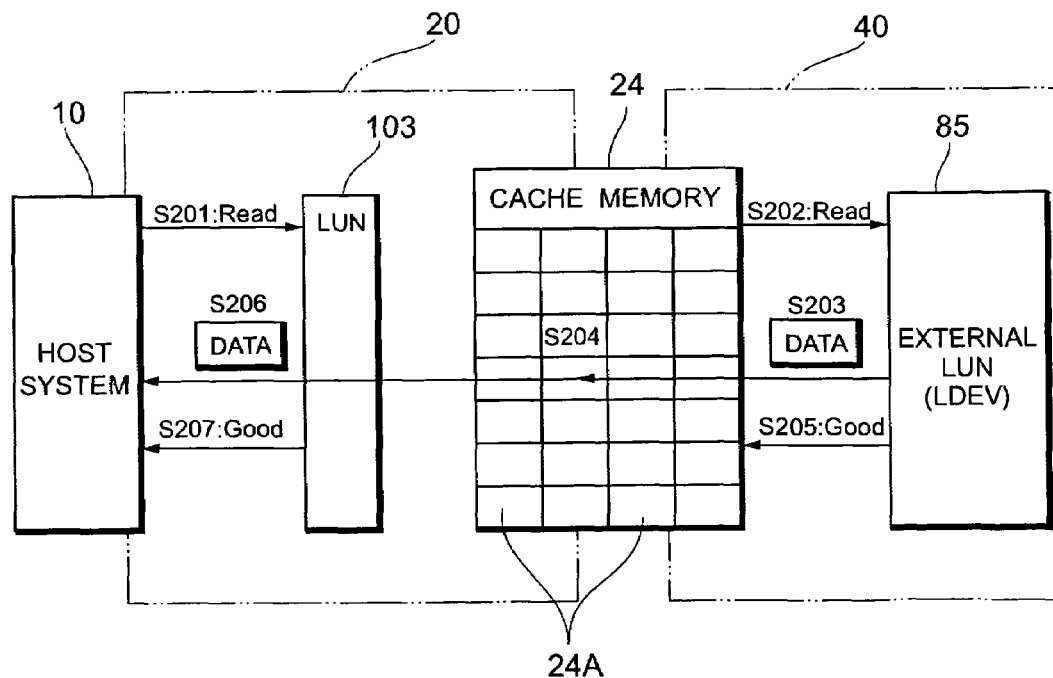
FIG. 11 is a diagram showing the flow of data during the read processing mainly regarding the usage of the cache memory.

FIG. 10 and FIG. 11 show the flow of data during read processing. FIG. 10 is a flowchart mainly showing the storage hierarchy, and FIG. 11 is a flowchart mainly showing the usage of the cache memory 24.

The process upon reading data from the LUN 85 of the storage controller 40 is now explained with reference to FIG. 10. Foremost, the host system 10 designates the port 64 and transmits the read command (Read) of data to the storage controller 20 (S201).

When the storage controller 20 receives the read command, it creates a read command for reading the requested data from the storage controller 40. The storage controller 20 transmits the created read command to the storage controller 40 (S202).

The storage controller 40 reads the requested data from the storage device 51 according to the read command received from the storage controller 20, transmits this to the storage controller 20 (S203), and reports that the reading has been completed normally (S205). The storage controller 20, as shown in FIG. 11, stores the data received from the storage controller 40 in a prescribed location of the cache memory 24 (S204).

After reading the data stored in the cache memory 24 and performing address conversion, the storage controller 20 transmits this to the host system 10 via the LUN 103 or the like (S206), and issues a read completion report (S207). This series of processes upon reading data is performed in reverse to the conversion operation described with reference to FIG. 8.

FIG. 7 shows a case as though data is read from the storage controller 40 in accordance from the request from the host system 10 and stored in the cache memory 24 every time. Nevertheless, it is not limited thereto, and, for instance, the whole or a part of the data stored in the LUN 85 of the storage controller 40 may be stored in the cache memory 24 in advance, and data may be immediately read from the cache memory 24 according to the read command from the host system 10 and transmitted to the host system 10.

Figure 12:
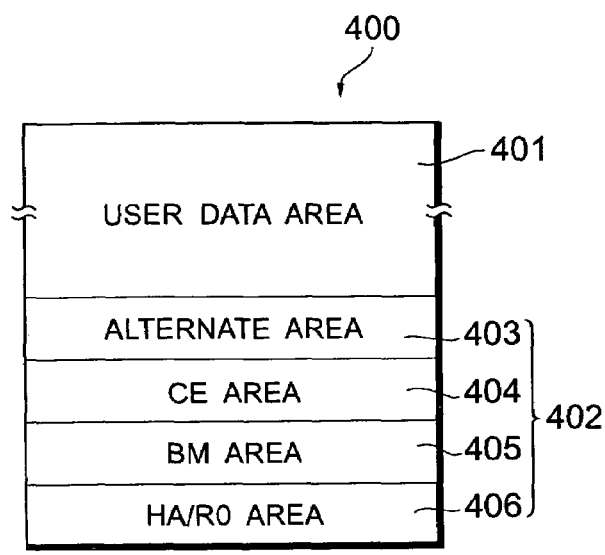
FIG. 12 is an explanatory diagram of the format of the mainframe volume.

FIG. 12 shows the formatting of the mainframe volume. The mainframe volume 400 has a user data area 401 storing user data, and a control information area 402 storing control cylinder information. The control information area 402 has an alternate area 403, a CE area 404, a BM area 405 and an HA/RO area 406. the alternate area 403 is a storage area for storing data in preparation for any failure in the user data area 401. The CE area 404 is a storage area for reading and writing test data. The BM area 405 is a storage area for storing information such as the record length of the user data area 401 or whether such record is an isometric record as bitmap information in each cylinder. The HA/RO area 406 is a storage area including HA (home address) and top record RO of the cylinder. The HA stores control information (for example, the logical address/physical address of the cylinder, or flag information regarding whether the cylinder is defective) of the respective cylinders.

In order to format the open system volume to the mainframe volume, the user data area 401 subject to 0 padding and the control information area 402 to which control cylinder information is written therein may be formed as an open system volume. Incidentally, as described later, user data area

401 does not necessarily have to be subject to 0 padding to be used as the mainframe volume.

Figure 13:
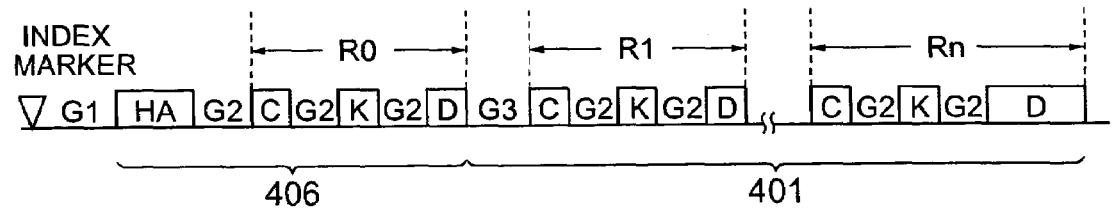
FIG. 13 is a diagram showing the track format of the mainframe volume.

FIG. 13 shows the track format (CKD format) of the mainframe volume. In FIG. 13, HA is the home address, C is the count unit, K is the key unit, D is the data unit, R0, R1, ..., Rn are records, and G1, G2, G3 gaps. HA and R0 are formed into an HA/R0 area 406, R1, ..., Rn are formed into a user data area 401.

Next, the outline of the formatting method of the present embodiment is explained. In order to format the storage device 51 of the storage controller 40 to the mainframe volume, the physical formatting function of the storage controller 40 is used to subject the user data area 401 to 0 padding. Further, the control cylinder information is transmitted to the storage controller 40 from the storage controller 20 via the communication network 202. The storage controller 40 writes the control cylinder information received from the storage controller 20 to the control information area 402. The 0 padding of the user data area 401 and the writing of the control cylinder information in the control information area 402 may be conducted simultaneously, or asynchronously. According to this method, the format data to be transmitted to the storage controller 40 from the storage controller 20 via the communication network 202 only needs to be control cylinder information, and high speed formatting can be realized without the data transmission speed of the communication channel becoming a bottleneck.

Incidentally, in the present specification, the 0 padding of the user data area 401 with the physical formatting function of the storage controllers 20, 40 is referred to as the "high speed formatting". Further, writing 0 data in the user data area 401 based on the write command designating the writing of 0 data or the writing of control cylinder information in the control information area 402 based on the write command designating the writing of the control cylinder information is referred to as "low speed formatting".

Figure 14:
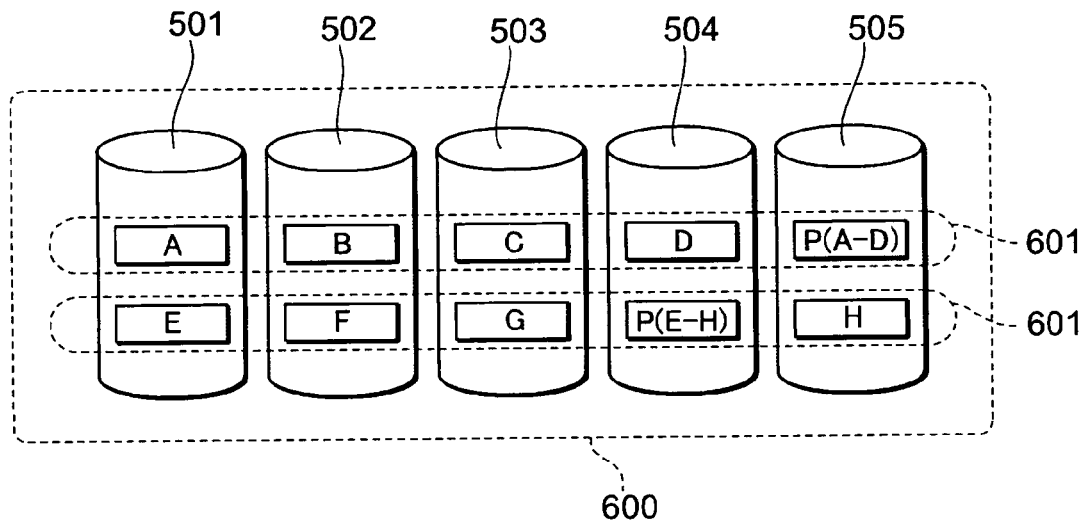
FIG. 14 is an explanatory diagram of a RAID group.
Figure 15:
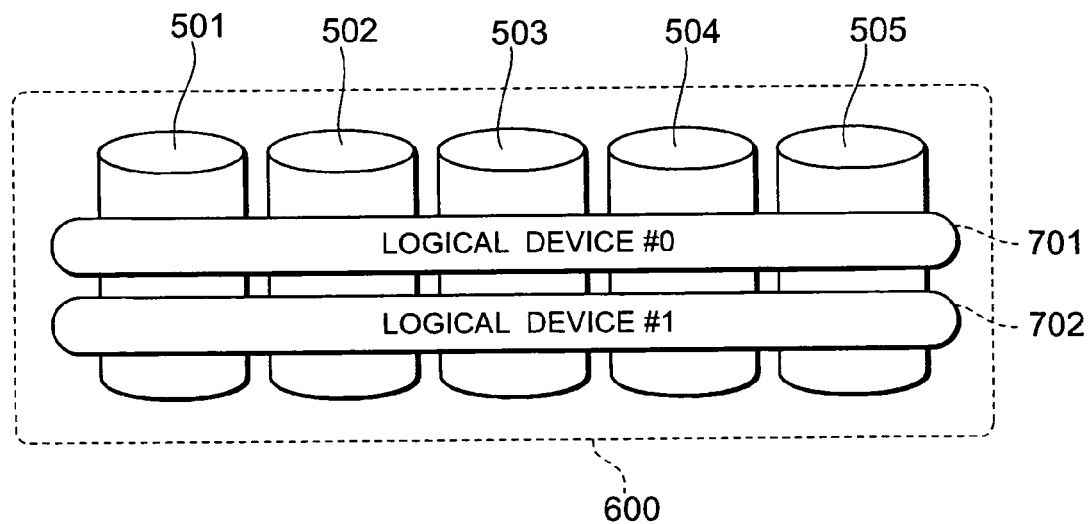
FIG. 15 is an explanatory diagram of a RAID group.

Here, the RAID group is explained with reference to FIG. 14 to FIG. 15. FIG. 14 shows a state where data is stored in the physical devices 501, 502, 503, 504, 505 according to RAID 5. With RAID 5, a plurality of physical devices 501, 502, 503, 504, 505 form a RAID group 600. In the example shown in FIG. 14, the physical devices 501, 502, 503, 504, 505 store data A, B, C, D and parity data P (A to D) for detecting errors in the data A, B, C, D. Similarly, the physical devices 501, 502, 503, 504, 505 store data E, F, G, H and parity data P (E to H) for detecting errors in the data E, F, G, H. This kind of combination of data and parity data is referred to as a stripe group 601. As shown in FIG. 15, a plurality of logical devices 701, 702 may be formed in a single RAID group 600. Each block of the respective logical devices 701, 702 is distributed and disposed in the plurality of physical devices 501, 502, 503, 504, 505.

When the plurality of logical devices subject to formatting all belong to the same RAID group, these plurality of logical devices may be collectively subject to high speed formatting. Nevertheless, when the plurality of logical devices subject to formatting do not all belong to the same RAID group; these plurality of logical devices may be not collectively subject to high speed formatting. In such a case, low speed formatting may be executed to the logical devices that cannot be subject to high speed formatting. In other words, as the condition for subject the plurality of logical devices to high speed formatting, it is necessary that the plurality of logical devices all belong to the same RAID group. Logical devices that do not belong to the same RAID group as the other logical devices subject to formatting or logical devices in which the high speed formatting was unsuccessful are subject to low speed formatting.

Figure 16:
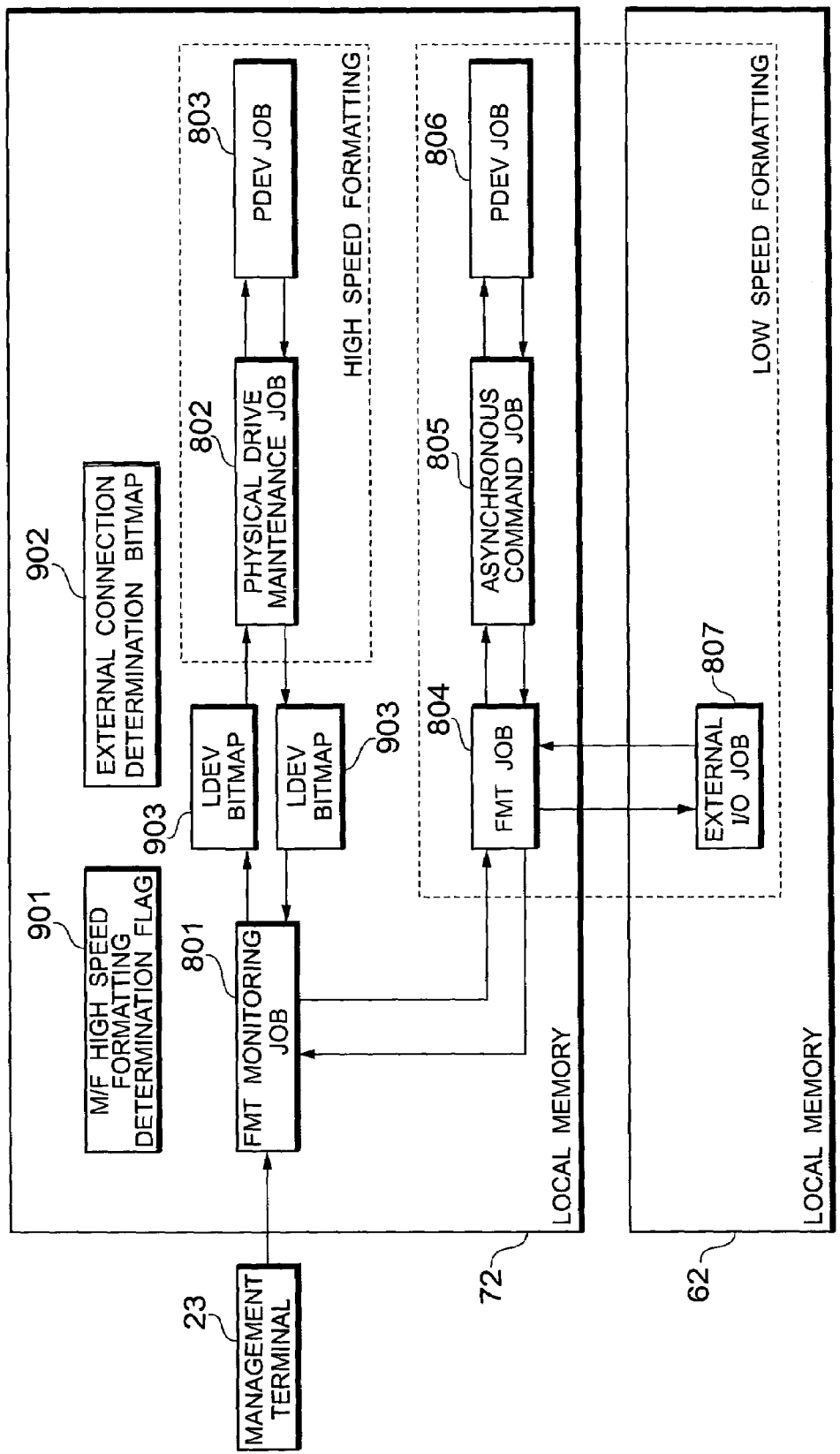
FIG. 16 is an explanatory diagram of various jobs of the mainframe format processing to be executed with the host-connected storage controller.

FIG. 16 shows the various jobs of mainframe format processing to be executed by the storage controller 20. Operating on the logical memory 72 of the disk adapter 22 are an FMT (format) monitoring job 801, a physical drive maintenance job 802, a PDEV job 803, an FMT job 804, an asynchronous command job 805 and a PDEV job 806. Operating on the local memory 62 of the channel adapter 21 is an external I/O job 807. High speed format is executed with the physical drive maintenance job 802 and PDEV job 803. Low speed format is executed with the FMT job 804, asynchronous command job 805, PDEV job 806 and external I/O job 807.

When the FMT monitoring job 801 receives a designation to format the logical device from the management terminal 23, it creates an LDEV bitmap 903 where the bit corresponding to the logical device subject to formatting is "1", and the bit corresponding to the logical device not subject to formatting is "0". The FMT management job 801 judges whether the logical device subject to formatting satisfies the conditions of high speed formatting, and designates the physical drive maintenance job 802 to perform high speed formatting. Further, the FMT monitoring job 801 designates the FMT job 804 to perform low speed formatting to logical devices that do not satisfy the conditions of high speed formatting among the logical devices subject to formatting, or logical devices that satisfied the conditions of high speed formatting but were unsuccessful with such high speed formatting.

When the physical drive maintenance job 802 is designated to perform high speed formatting from the FMT monitoring job 801, it refers to the M/F high speed formatting flag 901 and externally connected determination bitmap 902 to judge whether the logical device subject to formatting is a logical device formed on the external device (storage device 51), and, in a case where the logical device subject to formatting is formed on the external device (storage device 51), to determined whether such logical device is a target of the high speed formatting.

The M/F high speed formatting flag 901 is flag information showing whether to subject the external device to high speed formatting. When subjecting the external device to high speed formatting, the M/F high speed formatting flag 901 is set to "1", and, when the external device is not subject to high speed formatting, the M/F high speed formatting flag 901 is set to "0".

The externally connected determination bitmap 902 is bitmap information showing whether the logical device is formed on the internal device (storage device 31) or formed on the external device (storage device 51).

The physical drive maintenance job 802 designates the PDEV job 803 to perform high speed formatting when the logical device formed on the internal device (storage device 31) is to be subject to high speed formatting.

When high speed formatting is designated from the physical drive maintenance job 802, the PDEV job 803 performs a physical format to the storage device 31 with the physical formatting function of the disk adapter 22. When the physical drive maintenance job 802 receives a report notifying the completion of the high speed formatting from the PDEV job 803, it returns to the FMT monitoring job 801 the LDEV bitmap 903 in which the bit corresponding to the logical device subject to high speed formatting is converted from "1" to "0".

When the logical device subject to formatting is an internal device (storage device 31), the FMT job 804 designates the asynchronous command job 805 to perform low speed formatting, and designates the external I/O job 807 to perform low speed formatting when the logical device subject to formatting is an external device (storage device 51).

When low speed formatting is designated from the FMT job 804, the asynchronous command job 805 creates a write command for writing 0 data or control cylinder information and transmits this write command to the PDEV job 806. The format data (0 data or control cylinder information) to be handled by the asynchronous command job 805 is temporarily stored in the cache memory 24, and then written in the logical device subject to formatting.

Incidentally, the asynchronous command job 805 operates asynchronously with the I/O request from the host system 10.

When the PDEV job 806 receives a write command from the asynchronous command job 805, it writes 0 data in the user data area 401 of the internal device (storage device 31), or writes the control cylinder information in the control information area 402.

When low speed formatting is designated from the FMT job 804, the external I/O job 807 creates a write command for designating the writing of 0 data or control cylinder information, and transmits this to the storage controller 40 via the external port.

Incidentally, high speed formatting of the storage controller 20 only functions in relation to the internal device (storage device 31) of the storage controller 20. Low speed format of the storage controller 20 not only functions in relation to the internal device (storage device 31) of the storage controller 20, it also functions in relation to the external device (storage device 51) of the storage controller 40. However, when the storage controller 40 has a high speed formatting function, the high speed formatting function of the storage controller 40 may be used to subject the storage device 51 to high speed formatting. The formatting method of the present embodiment may also be applied to cases where the storage controller 40 does not have a high speed formatting function.

Figure 17:
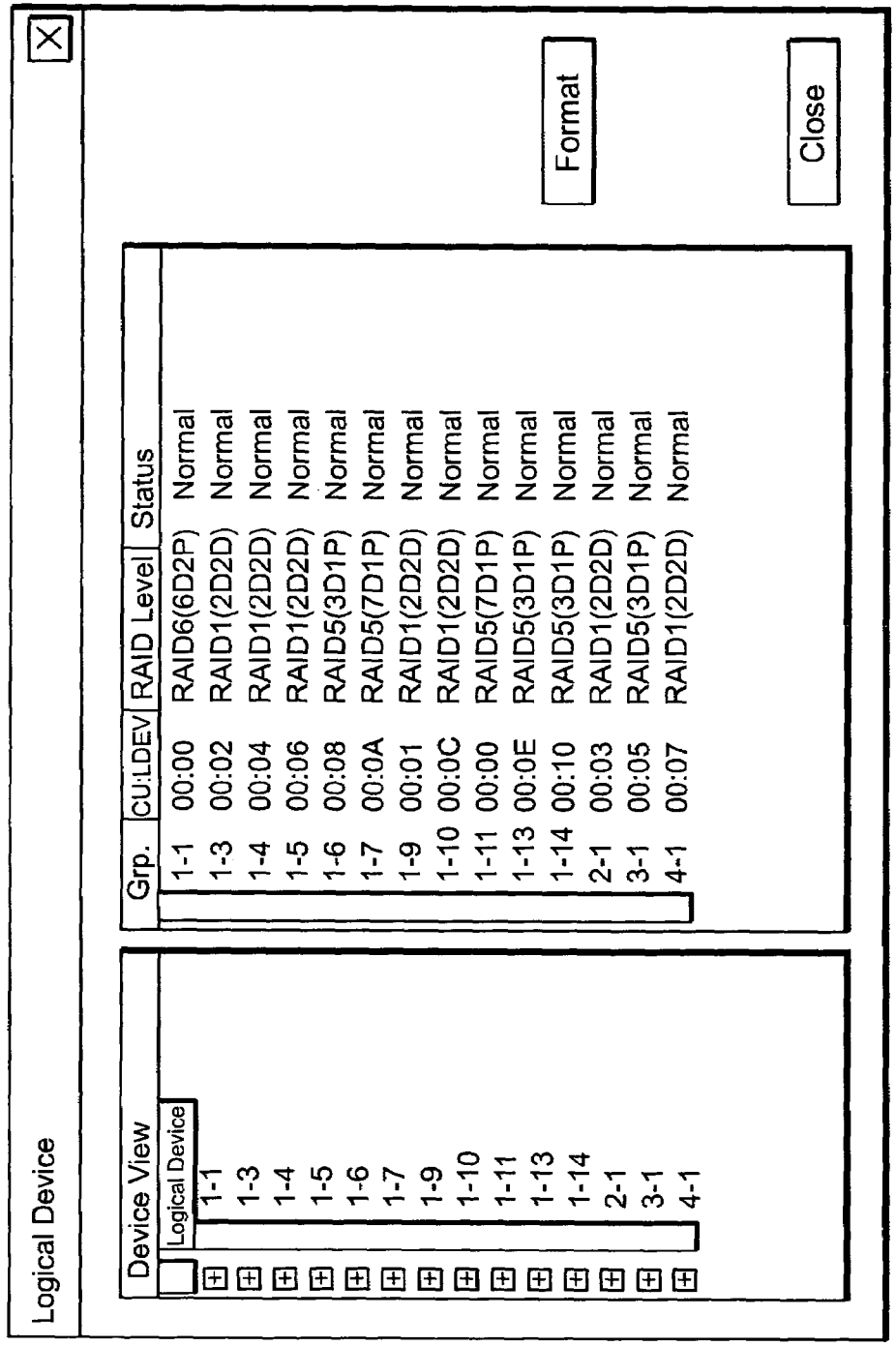
FIG. 17 is an operation screen for giving formatting instructions to the host-connected storage controller.

FIG. 17 shows the operation screen for the system administrator operate the management terminal 23 and designate formatting to the storage controller 20. the system administrator selects one or a plurality of logical devices subject to formatting while referring to this operation screen. When there are a plurality of logical devices to be provided by the storage controller 20 to the host system 10, the system administrator may select to perform a mainframe format or open format regarding the respective logical devices.

Figure 18:
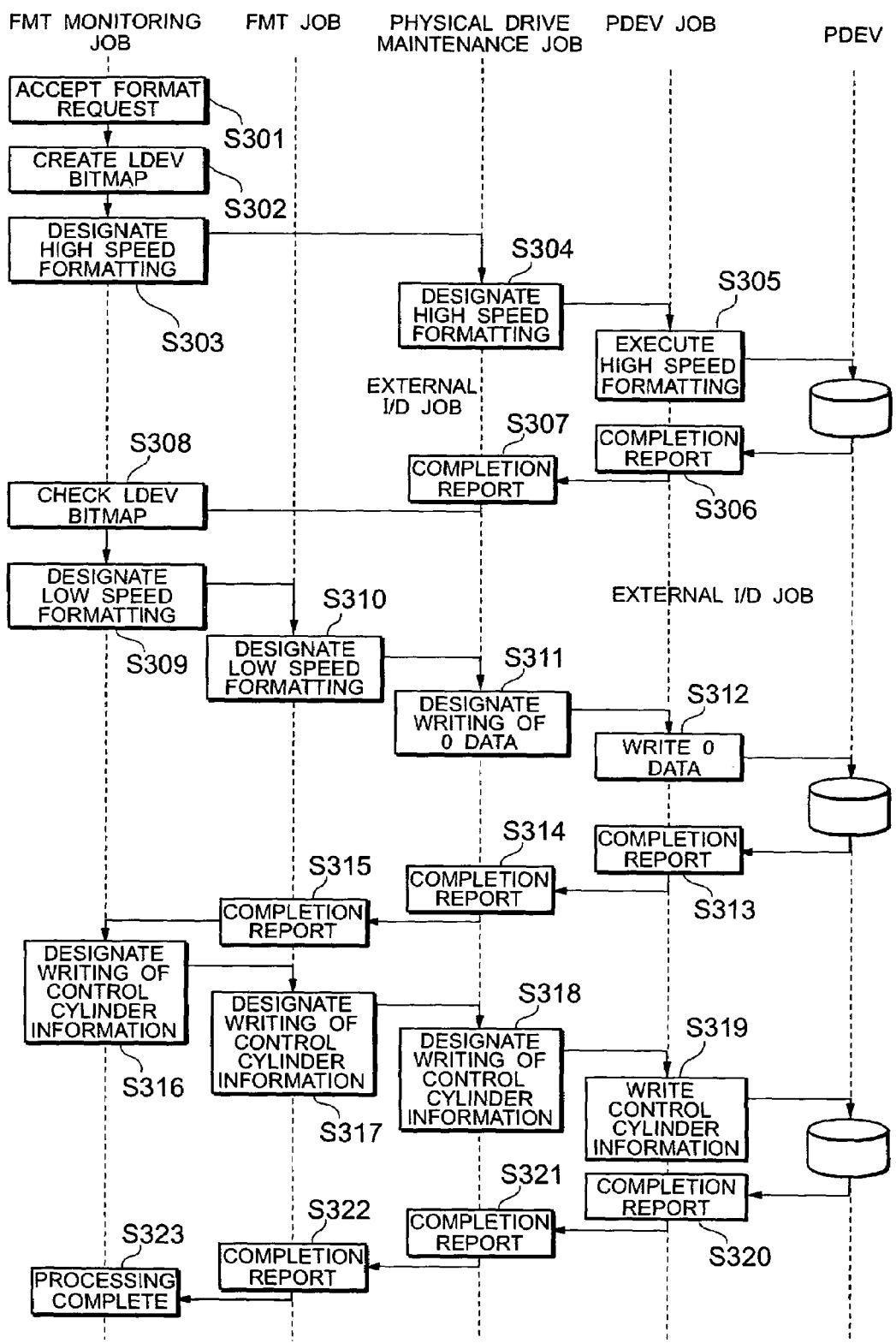
FIG. 18 is a sequence chart showing the flow of processing when the host-connected storage controller formats the internal device.

FIG. 18 is a sequence chart showing the flow of processing when the storage controller 20 is to format the internal device (storage device 31) for a mainframe (in this example, the storage controller 20 has a high speed formatting function).

When the system administrator makes input operations with the management terminal 23 and designates to format the logical device for a mainframe, the FMT monitoring job 801 receives the formatting request (S301), and creates a LDEV bitmap 903 (S302). Then, the FMT monitoring job 801 transmits the LDEV bitmap 903 to the physical drive maintenance job 802 and designates high speed formatting (S303).

Then, the physical drive maintenance job 802 refers to the externally connected determination bitmap 902, and checks to see whether the logical device subject to formatting is formed on an internal device or formed on an external device. As described above, since the logical device subject to formatting is formed on an internal device, the physical drive maintenance job 802 designates the PDEV job 803 to perform high speed formatting (S304).

Incidentally, in a case where a plurality of logical devices subject to formatting are designated, and the logical devices subject to formatting do not all belong to the same RAID group, the physical drive maintenance job 802 designates the implementation of high speed formatting to one or a plurality of logical devices belonging to the same RAID group.

When the PDEV job 803 receives a designation of high speed formatting from the physical drive maintenance job 802, it performs high speed formatting to the designated logical device (S305). When high speed formatting is complete, the PDEV job 803 reports the completion of high speed formatting to the physical drive maintenance job 802 (S306).

When the physical drive maintenance job 802 receives the high speed formatting completion report from the PDEV job 803, it rewrites the bit corresponding to the logical devices that were normally subject to high speed formatting among the LDEV bitmap 903 from "1" to "0", returns the LDEV bitmap 903 to the FMT monitoring job 801, and reports the completion of high speed formatting (S307).

Then, the FMT monitoring job 801 checks the LDEV bitmap 903 (S308), and designates the FMT job 804 to perform low speed formatting to the logical devices in which the corresponding bit among the LDEV bitmap 903 is "1" (S309). Logical devices where the corresponding bit among the LDEV bitmap 903 is "1" do not belong to the same RAID group as the other logical devices, or were not subject to normal high speed formatting.

When the FMT job 804 receives a designation of low speed formatting from the FMT monitoring job 801, it designates the asynchronous command job 805 to perform low speed formatting (S310). Then, the asynchronous command job 805 creates a write command for designating the writing of 0 data in the user data area 401, and designates the PDEV job 806 to write 0 data (S311).

When the PDEV job 806 receives the designation to write 0 data from the asynchronous command job 805, it writes 0 data in the user data area 401 (S312). When the writing of 0 data is complete, the PDEV job 806 reports the completion of processing to the asynchronous command job 805 (S313). When the asynchronous command job 805 receives the processing completion report from the PDEV job 806, it reports the completion of processing to the FMT job 804 (S314). When the FMT job 804 receives the processing completion report from the asynchronous command job 805, it reports the completion of processing to the FMT monitoring job 801 (S315).

As described above, when the formatting of the user data area 401 is complete, the FMT monitoring job 801 designates the FMT job 804 to write control cylinder information (S316).

When the FMT job 804 receives the designation to write control cylinder information from the FMT monitoring job 801, it designates the asynchronous command job 805 to write control cylinder information (S317). Then, the asynchronous command job 805 creates a write command for designating the writing of control cylinder information in the control information area 402, and designates the PDEV job 806 to write control cylinder information (S318).

When the PDEV job 806 receives the designation to write control cylinder information from the asynchronous command job 805, it writes control cylinder information in the control information area 402 (S319). When the writing of control cylinder information is complete, the PDEV job 806 reports the completion of processing to the asynchronous command job 805 (S320).

When the asynchronous command job 805 receives the processing completion report form the PDEV job 806, it reports the completion of processing to the FMT job 804 (S321). When the FMT job 804 receives the processing completion report from the asynchronous command job 805, it reports the completion of processing to the FMT monitoring job 801 (S322).

Based on the foregoing processes, the processing of the storage controller 20 formatting internal device (storage device 31) for a mainframe is completed (S323).

Figure 19:
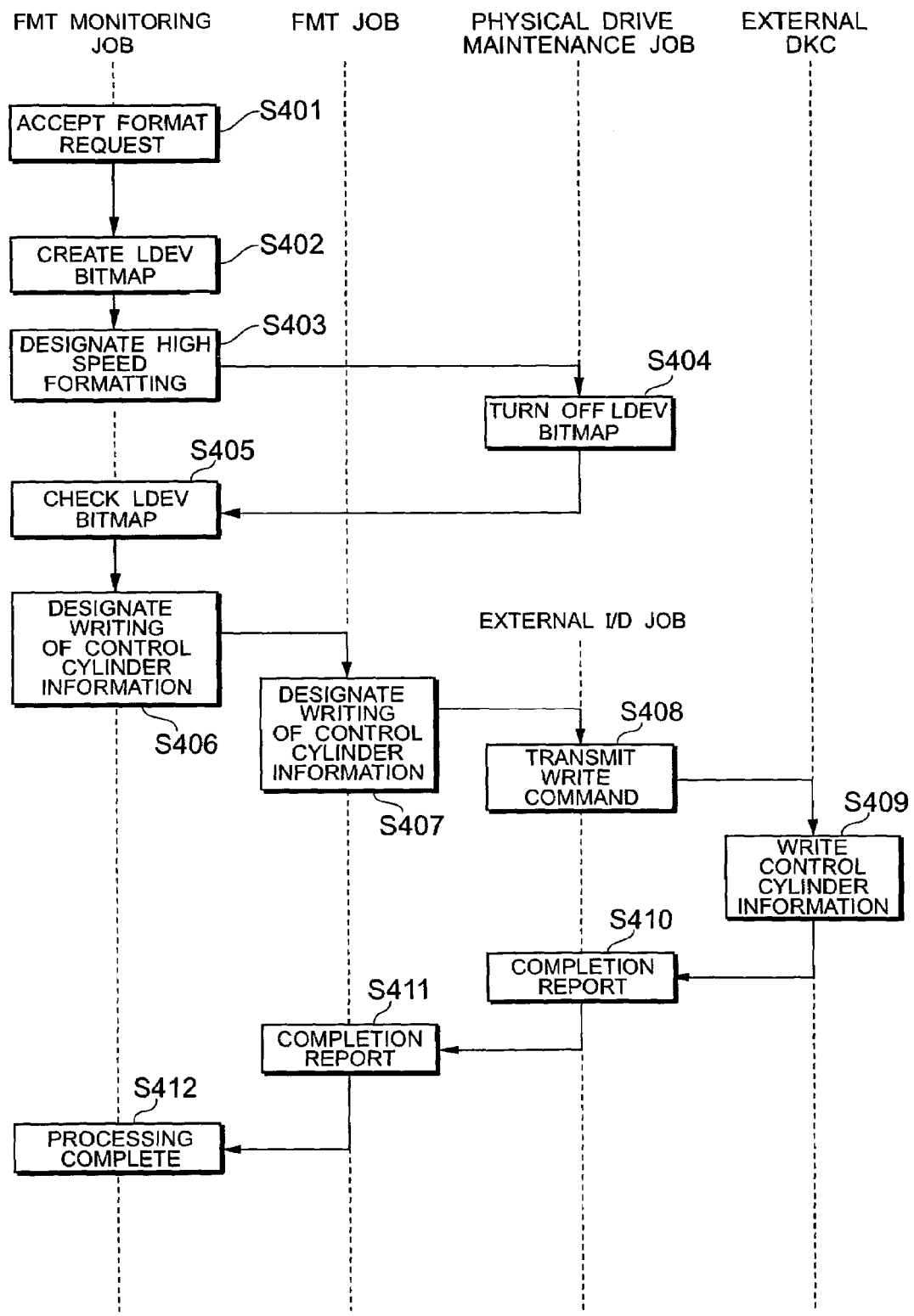
FIG. 19 is a sequence chart showing the flow of processing when formatting an external device into a mainframe by the host-connected storage controller transmitting control cylinder information to the externally connected storage controller.

FIG. 19 is a sequence chart showing the flow of processing when the storage controller 20 is to format the external device (storage device 51) of the storage controller 40 for a mainframe (in this example, the storage controller 40 has a high speed formatting function, and the M/F high speed formatting flag 901 is set to "1").

When the system administrator makes input operations with the management terminal 23, and designates the formatting of the logical device for a mainframe, the FMT monitoring job 801 receives the formatting request (S401), and creates an LDEV bitmap 903 (S402). And, the FMT monitoring job 801 transmits the LDEV bitmap 903 to the physical drive maintenance job 802 and designates high speed formatting (S403).

Then, the physical drive maintenance job 802 refers to the externally connected determination bitmap 902 and checks to see whether the logical device subject to formatting is formed on an internal device or formed on an external device. As described above, since the logical device subject to formatting is formed on an external device, the physical drive maintenance job 802 checks the M/F high speed formatting flag 901. As described above, since the M/F high speed formatting flag 901 is set to "1,", the physical drive maintenance job 802 rewrites the "1" of the LDEV bitmap 903 all to "0", and returns the LDEV bitmap 903 to the FMT monitoring job 801 (S404).

Incidentally, since the "1" of the LDEV bitmap 903 are all rewritten to "0", the writing of 0 data in the user data area 401 of the external device (storage device 51) will not be performed with the function of the storage controller 20. The 0 padding to the user data area 401 of the external device (storage device 51) is processed with the physical formatting function of the storage controller 40. In order to provide the storage controller 40 with the opportunity to perform high speed formatting to the external device (storage device 51) with the physical formatting function of the storage controller 40, the constitution may be such that the storage controller 20 transmits a format command to the storage controller 40.

When the FMT monitoring job 801 receives the LDEV bitmap 903 from the physical drive maintenance job 802, it checks the LDEV bitmap (S405). Since the LDEV bitmap 903 is all "0", the FMT monitoring job 801 designates the FMT job 804 to write control cylinder information (S406).

When the FMT job 804 receives the designation to write control cylinder information from the FMT monitoring job 801, it designates the external I/O job 807 to write control cylinder information (S407).

Then, the external I/O job 807 creates a write command for designating the writing of control cylinder information in the control information area 402, and transmits the write command to the storage controller 40 via the external port (S408).

When the storage controller 40 (external DKC) receives the write command designating the writing of control cylinder information from the storage controller 20, it writes control cylinder information in the control information area 402 of the external device (storage device 51) (S409).

When the writing of control cylinder information in the control information area 402 is complete, the external I/O job 807 reports the completion of writing of control cylinder information to the FMT job 804 (S410). The FMT job 804 reports the completion of writing of control cylinder information to the FMT monitoring job 801 (S411).

Based on the foregoing processes, the processing of the storage controller 20 formatting external device (storage device 51) for a mainframe is completed (S412).

Incidentally, further high speed formatting can be realized by the 0 padding of the user data area 401 with the physical formatting function of the storage controller 40 being conducted in parallel with the writing of control cylinder information in the control information area 402.

Figure 20:
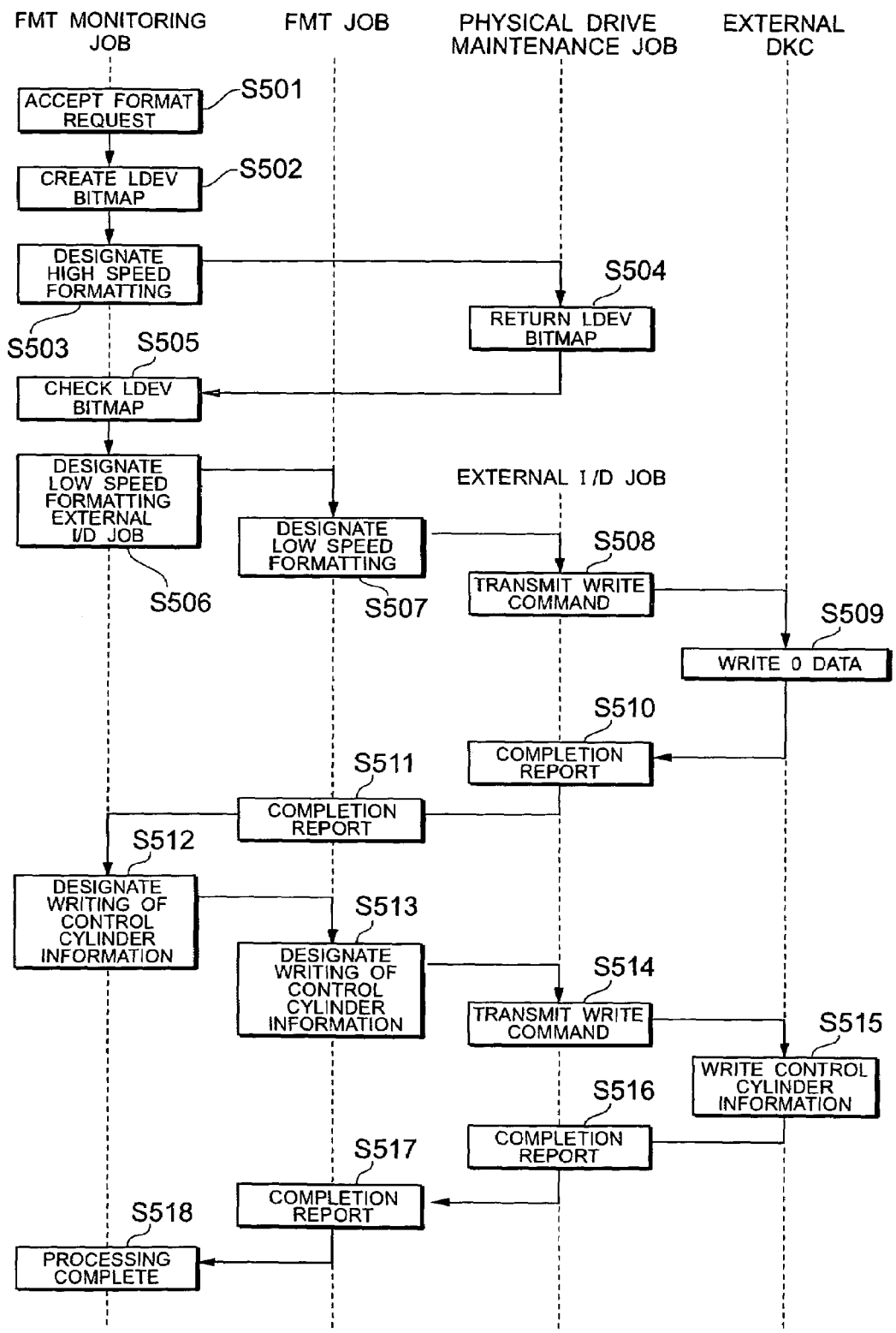
FIG. 20 is a sequence chart showing the flow of processing when formatting an external device into a mainframe by the host-connected storage controller transmitting 0 data and control cylinder information to the externally connected storage controller.

FIG. 20 is a sequence chart showing the flow of processing when the storage controller 20 is to format the external device (storage device 51) of the storage controller 40 for a mainframe (in this example, the storage controller 40 does not have a high speed formatting function, and the M/F high speed formatting flag 901 is set to "0").

When the system administrator makes input operations with the management terminal 23 and designates the formatting of the logical device for a mainframe, the FMT monitoring job 801 receives the formatting request (S501), and creates an LDEV bitmap 903 (S502). Then, the FMT monitoring job 801 transmits the LDEV bitmap 903 to the physical drive maintenance job 802, and designates high speed formatting (S503).

Then, the physical drive maintenance job 802 refers to the externally connected determination bitmap 902, and checks to see whether the logical device subject to formatting is formed on an internal device or formed on an external device. As described above, since the logical device subject to formatting is formed on an external device, the physical drive maintenance job 802 checks the M/F high speed formatting flag 901. As described above, since the M/F high speed formatting flag 901 is set to "0", the physical drive maintenance job 802 returns the LDEV bitmap 903 as is to the FMT monitoring job 801 without rewriting the LDEV bitmap 903 (S504).

When the FMT monitoring job 801 receives the LDEV bitmap 903 from the physical drive maintenance job 802, it checks the LDEV bitmap 903 (S505), and designates the FMT job 804 to perform low speed formatting to the logical device subject to formatting (S506).

When the FMT job 804 receives the designation to perform low speed formatting from the FMT monitoring job 801, it designates the external I/O job 807 to write 0 data (S507).

Then, the external I/O job 807 creates a write command for writing 0 data in the user data area 401, and transmits the write command to the storage controller 40 via the external port (S508).

When the storage controller 40 receives the write command for writing 0 data from the storage controller 20, it writes 0 data in the user data of the external device (storage device 51) (S509).

When the writing of 0 data in the user data area 401 is complete, the external I/O job 807 reports the completion of writing of 0 data to the FMT job 804 (S510). The FMT job 804 reports the completion of writing of 0 data to the FMT monitoring job 801 (S511).

Then, the FMT monitoring job 801 designates the FMT job 804 to write control cylinder information (S512). When the FMT job 804 receives the designation to write control cylinder information from the FMT monitoring job 801, it designates the external I/O job 807 to write control cylinder information (S513).

The external I/O job 807 creates a write command for designating the writing of control cylinder information in the control information area 402, and transmits the write command to the storage controller 40 via the external port (S514).

When the storage controller 40 receives the designation for writing control cylinder information from the storage controller 20, it writes control cylinder information in the control information area 402 of the external device (storage device 51) (S515).

When the writing of control cylinder information in the control information area 402 is complete, the external I/O job 807 reports the completion of writing of control cylinder information to the FMT job 804 (S516). The FMT job 804 reports the completion of writing of control cylinder information to the FMT monitoring job 801 (S517).

Based on the foregoing processes, the processing of the storage controller 20 formatting external device (storage device 51) for a mainframe is completed (S518).

Incidentally, when the storage controller 20 is to format the storage device 51 of the storage controller 40 for a mainframe, the user data area 401 of the storage device 51 does not necessarily have to be subject to 0 padding. An example of a case of not subjecting the user data area 401 to 0 padding during the format of the storage device 51 is additionally explained.

Figure 21:
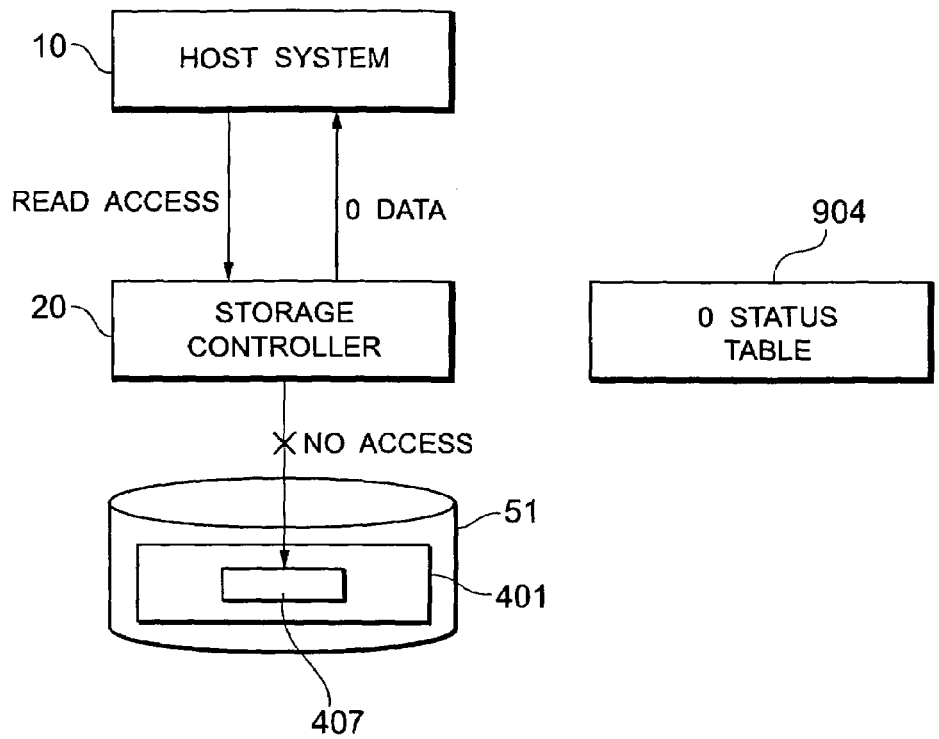
FIG. 21 is a diagram showing the outline of the processing when read access is made to a block with no write access in the past.
Figure 22:
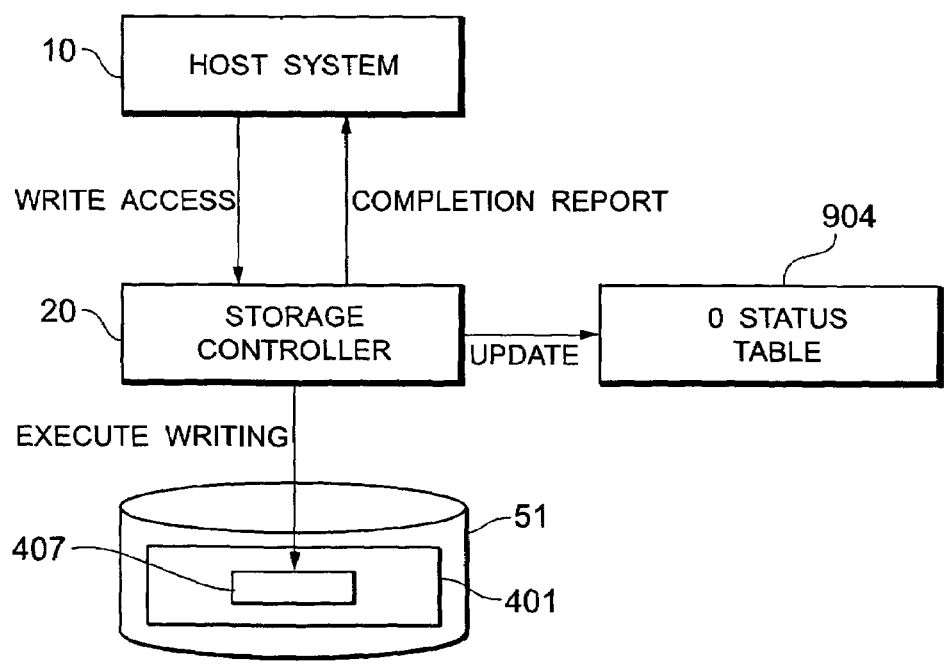
FIG. 22 is a diagram showing the outline of the processing when write access is made to a block.
Figure 23:
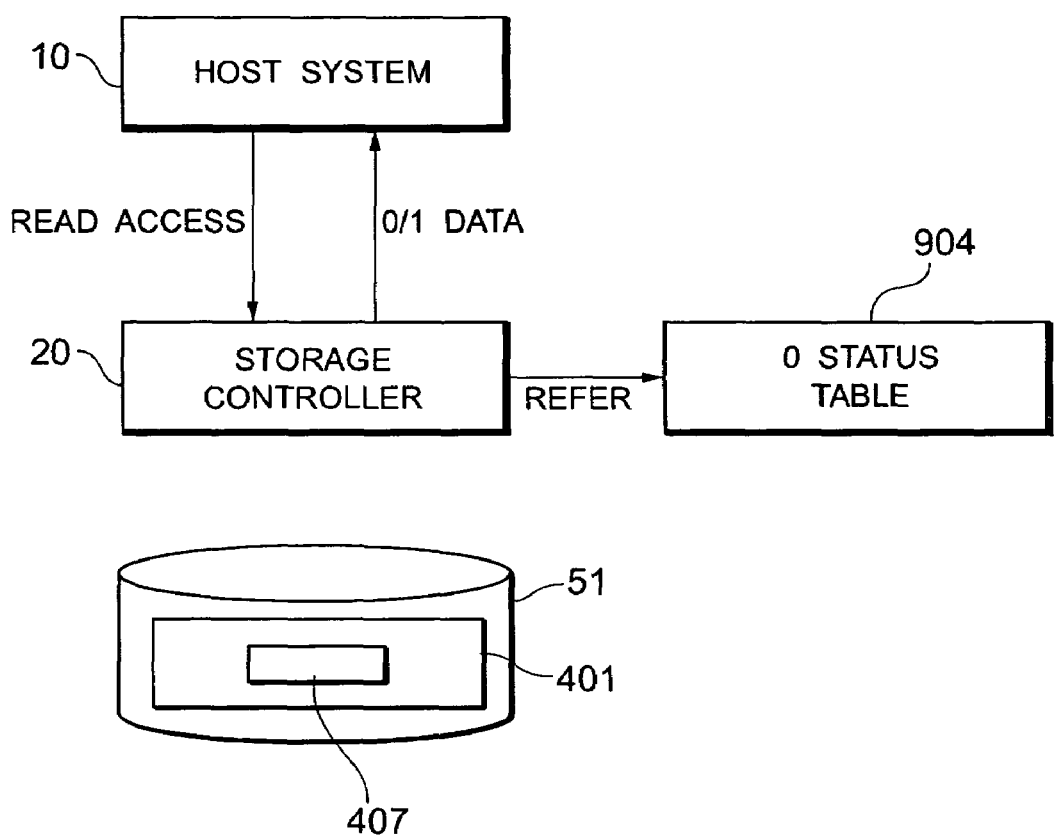
FIG. 23 is a diagram showing the outline of the processing when read access is made to a block having a write access in the past.

As shown in FIG. 21, the storage controller 20 returns 0 data to the host system 10 in response to the read access to the block 407 of the user data block 401 of the storage device 51 subject to no write access existing in the block 407 in the past. Meanwhile, as shown FIG. 22, the storage controller 20 executes the writing of data in the block 407 in response to the write access to the block 407 of the user data area 401, and stores in the status table 904 whether 0 data or 1 data was written in the block 407. The 0 status table is a bitmap table storing the latest write data (0/1 data) regarding the respective blocks 407 in the user data area 401. And, as shown in FIG. 23, when the read access to a block 407 to which a write access was made in the past, the storage controller 20 refers to the 0 status table 904 and returns the latest write data (0/1 data). The 0 status table 904 is stored in the likes or a shared memory 25 or a cache memory 24.

According to the present embodiment, since there is no need to include 0 data for subjecting the user data area 401 to 0 padding in the format data to be transmitted from the storage controller 20 to the storage controller 40, and it will suffice so as long as control cylinder information is contained therein, high speed formatting can be realized.

Further, if it is possible for the storage controller 40 to subject the user data area 401 to 0 padding with the physical formatting function, further high speed formatting can be realized.

Moreover, even if the storage controller 40 is not equipped with a physical formatting function for subjecting the user data area 401 to 0 padding, so as long as the storage controller 20 retains the 0 status table 904, the storage device 51 can be used as the mainframe volume by writing control cylinder information in the control information area 402 without having to subject the user data area 401 to 0 padding.

We claim:

1. A storage system comprising:
    a host system;
    a first storage sub-system including at least one first physical storage device and a first storage controller connected to the host system and directly connected with said first physical storage device to exercise an exclusively control thereon; and
    a second storage sub-system including at least one second physical storage device and a second storage controller connected to the first storage controller and directly connected with said second physical storage device to exercise an exclusively control thereon,
    wherein the first storage controller further comprises:
    a first controller configured to virtualize a storage area located in said second physical storage device and exclusively controlled by the second storage controller and provide a virtualized storage area as if internally controlled by the first storage controller to the host system;
    a memory configured to store format identifying information for the storage area; and
    a second controller configured to designate, when receiving a request for formatting of the storage area, the second storage controller to format the storage area based on the format identifying information stored in the memory, and
    wherein the format identifying information is information for identifying either as first formatting that designates the second controller to transmit only a first write command for writing control information to said second storage controller which then writes said control information into a control information area in the storage area, or as second formatting that designates the second controller to transmit a second write command for writing data of value 0 to said second storage controller which then writes said data of value 0 into a user data area in the storage area, and to transmit the first write command to said second storage controller which then writes said control information into the control information area in the storage area.

2. The storage system according to claim 1, wherein the format identifying information only identifies a first formatting that designates the second controller to transmit only a first write command for writing control information to said second storage controller which then writes said control information into a control information area in the storage area,
    said first storage controller further comprises a 0 status table for retaining latest write data regarding respective blocks in the user data area of said storage area, and returns data of value 0 to a read access to a prescribed block in the user data area of said storage area when there is no write access to said block in the past, refers to said 0 status table, and returns the latest write data when there is a write access to said block in the past, and writes the write data in said block in response to the write access to a prescribed block in the user data area of said storage area.

3. The storage system according to claim 1, wherein the second controller selects, based on the format identifying information, the first or second formatting according to functions the second storage controller has.

4. The storage system according to claim 3, wherein the first controller creates a write command according to the formatting selected by the second controller, and transmits the write command to the second storage controller.

5. The storage system according to claim 3, wherein if the second controller selects the second formatting, the second storage controller simultaneously writes said data of value 0 to the user data area in the storage area and writes said transmitted control information into the control information area in the storage area.

6. The storage system according to claim 1, wherein the second controller determines, when receiving a request for formatting of a plurality of storage areas, whether or not all those storage areas belong to one RAID group, and, if not, selects the second formatting.

7. The storage system according to claim 1, wherein the first controller virtualizes the storage area of an open system type, as a storage area of a mainframe type, and provides the virtualized storage area to the host system.

8. A method of formatting a storage system having a host system, a first storage sub-system including at least one first physical storage device and a first storage controller having a memory and being connected to the host system and directly connected with said first physical storage device to exercise an exclusively control thereon, and a second storage sub-system including at least one second physical storage device and a second storage controller connected to the first storage controller and directly connected with said second physical storage device to exercise an exclusively control thereon, the method comprising the steps of:

virtualizing a storage area located in said second physical storage device and exclusively controlled by the second storage controller as a virtualized storage area as if internally controlled by the first storage controller to the host system;

storing format identifying information of the storage area in the memory of the first storage controller, the format identifying information being information for identifying either as first formatting or second formatting;

designating, when receiving a request for formatting of the storage area, the second storage controller to format the storage area based on the format identifying information stored in the memory; and (1) when said first formatting is designated, transmitting by the second controller only a first write command for writing control information to said second storage controller which then writes said control information into a control information area in the storage area;

(2) when said second formatting is designated, transmitting by the second controller a second write command for writing data of value 0 to said second storage controller which then writes said data of value 0 into a user data area in the storage area, and the first write command to said second storage controller which then writes said control information into the control information area in the storage area.

9. The formatting method according to claim 8, further comprising:

transmitting by the second controller only a first write command for writing control information to said second storage controller which then writes said control information into a control information area in the storage area;

maintaining by said first storage controller a 0 status table which contains latest write data regarding respective blocks in the user data area of said storage area; and returning by said first storage controller returns data of value 0 to a read access to a prescribed block in the user data area of said storage area when there is no write access to said block in the past, or referring said 0 status table and returns the latest write data when there is a write access to said block in the past, and writing the write data in said block in response to the write access to a prescribed block in the user data area of said storage area.

10. The formatting method according to claim 8, wherein the second controller selects, based on the format identifying information, the first or second formatting according to functions the second storage controller has.

11. The formatting method according to claim 10, wherein the first controller creates a write command according to the formatting selected by the second controller, and transmits the write command to the second storage controller.

12. The formatting method according to claim 10, wherein if the second controller selects the second formatting, the second storage controller simultaneously writes said data of value 0 to the user data area in the storage area and writes said transmitted control information into the control information area in the storage area.

13. The formatting method according to claim 8, wherein the second controller determines, when receiving a request for formatting of a plurality of storage areas, whether or not all those storage areas belong to one RAID group, and, if not, selects the second formatting.

14. The formatting method according to claim 8, wherein the first controller virtualizes the storage area of an open system type, as a storage area of a mainframe type, and provides the virtualized storage area to the host system.

* * * * *